United States Patent [19]
Gotoh et al.

[11] Patent Number: 5,396,269
[45] Date of Patent: Mar. 7, 1995

[54] TELEVISION TELEPHONE

[75] Inventors: Hiroshi Gotoh; Kiyoshi Ishida, both of Yokohama; Yoji Shibata, Yokosuka; Masahiro Takahashi, Hitachi; Masaaki Takizawa, Tokyo; Kenji Yokoi, Matsudo; Katsumi Mikamo, Katsuta; Yoshinobu Matsubayashi, Yokosuka; Iwao Ishinabe, Yokohama; Toshiaki Watanuki, Fujisawa; Jun Furuya; Takushi Yoshimaru, both of Kokubunji, all of Japan

[73] Assignee: Hitachi, Ltd., Tokyo, Japan

[21] Appl. No.: 838,348

[22] Filed: Feb. 20, 1992

[30] Foreign Application Priority Data

Feb. 20, 1991 [JP] Japan ................................. 3-025987
Feb. 20, 1991 [JP] Japan ................................. 3-025991

[51] Int. Cl.$^6$ ........................ H04M 11/00; H04N 7/14
[52] U.S. Cl. ................................................. 348/14
[58] Field of Search ...................... 379/53, 96, 94, 93; 358/85; H04N 7/14; 348/14, 15, 16, 17, 18, 19, 20

[56] References Cited

U.S. PATENT DOCUMENTS

| | | |
|---|---|---|
| 4,258,387 | 3/1981 | Lemelson et al. |
| 4,816,901 | 3/1989 | Music et al. ........................ 358/85 |
| 4,888,795 | 12/1989 | Ando et al. ........................ 379/53 |
| 4,924,311 | 5/1990 | Ohki et al. ........................ 379/53 |
| 4,995,071 | 2/1991 | Weber et al. ........................ 358/85 |
| 5,012,348 | 4/1991 | Witzel et al. ........................ 358/85 |
| 5,063,440 | 11/1991 | Hong ........................ 379/53 |
| 5,073,926 | 12/1991 | Suzuki et al. ........................ 379/53 |
| 5,111,498 | 5/1992 | Guichard et al. ........................ 379/53 |

FOREIGN PATENT DOCUMENTS

| | | |
|---|---|---|
| 310477 | 4/1989 | European Pat. Off. |
| 348623 | 1/1990 | European Pat. Off. |
| 0158182 | 9/1984 | Japan ........................ 379/53 |
| 030888 | 2/1986 | Japan . |
| 0243681 | 9/1989 | Japan ........................ H04N 7/14 |
| 0300786 | 12/1989 | Japan ........................ H04N 7/14 |
| 22989 | 1/1990 | Japan . |
| 69088 | 3/1990 | Japan . |
| 0119488 | 5/1990 | Japan ........................ H04N 7/14 |
| 4-029489 | 1/1992 | Japan ........................ H04N 7/14 |
| 2219464 | 12/1989 | United Kingdom ........................ 379/53 |

OTHER PUBLICATIONS

"For Videophones, Light at the End of a Very Long Tunnel," S. Saunders, *Data Communications*, vol. 20, No. 17, Dec. 1991, p. 116.

"Bell's Visual Terminal Uses Plasma Display," *Electronics Week*, vol. 49, No. 1, 1 Apr. 1976, p. 36.

*Primary Examiner*—Curtis Kuntz
*Assistant Examiner*—Stella L. Woo
*Attorney, Agent, or Firm*—Antonelli, Terry, Stout & Kraus

[57] ABSTRACT

A television telephone including a movable head section, a support section and a bottom section. The movable head section includes an imaging device for inputting images and a display for displaying images. The bottom section includes a communication controller for transmission and reception of encoded information of at least one of audio and visual signals to and from a communication network, and a telephone controller for controlling transmission and reception functions and including a key console unit. The support section serves for connecting the bottom section and the movable head section and for supporting the movable head section and includes an image encoder/decoder for encoding image input signals and for decoding received image signals.

40 Claims, 28 Drawing Sheets

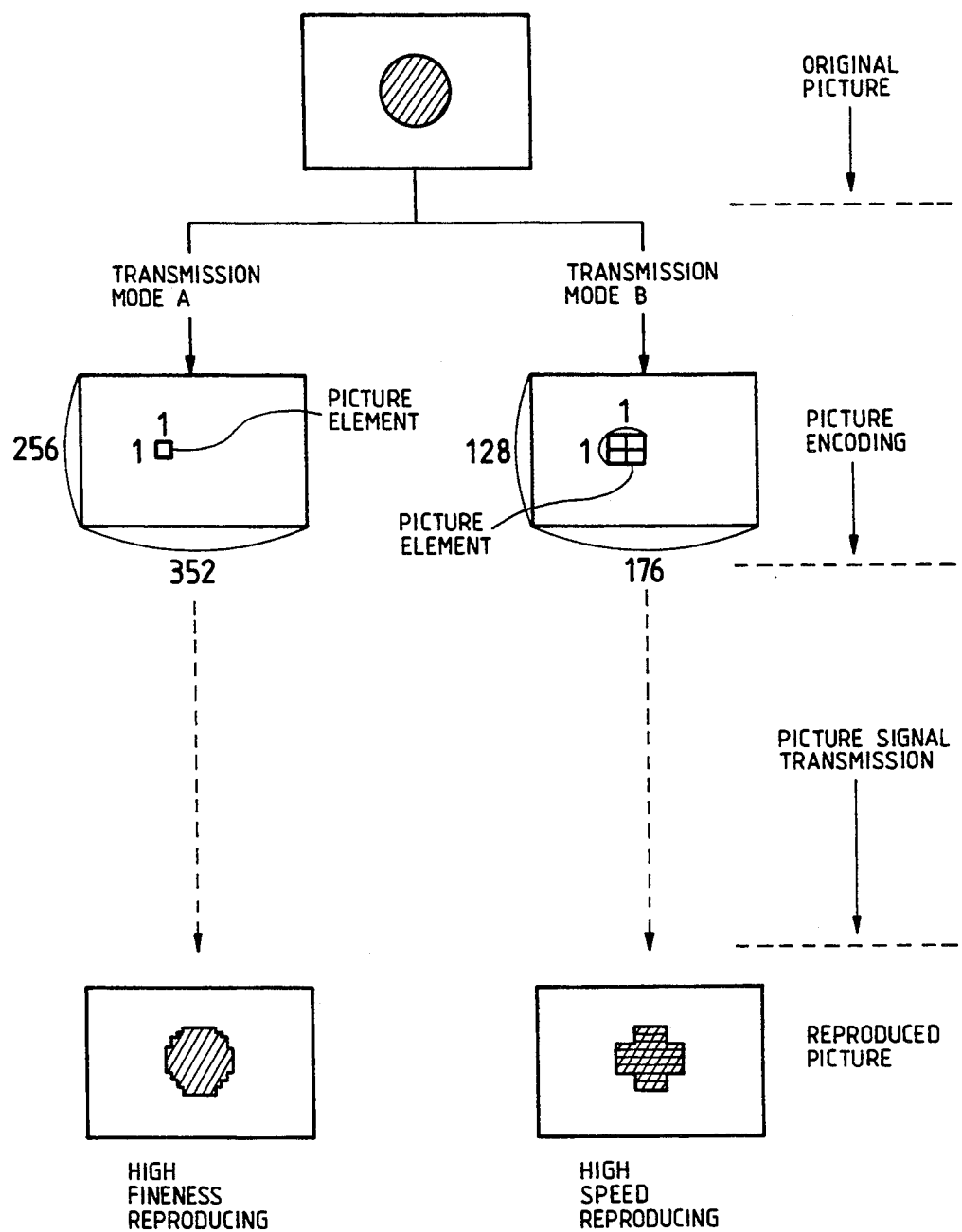

FIG. 28
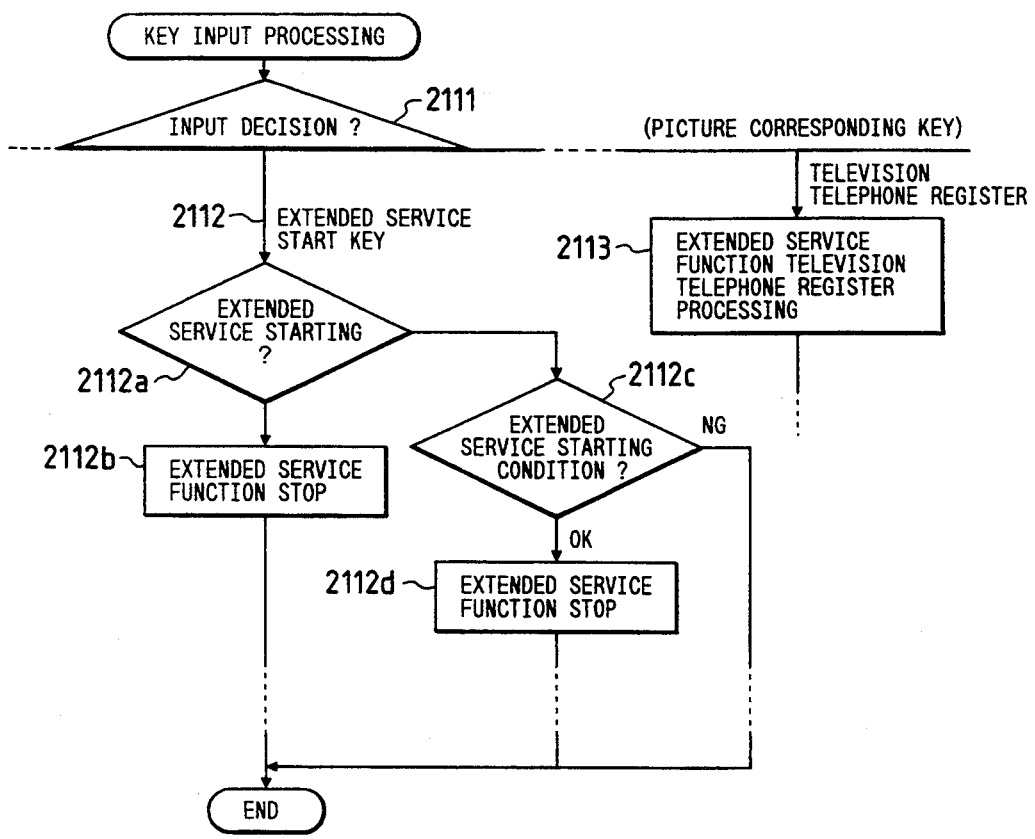
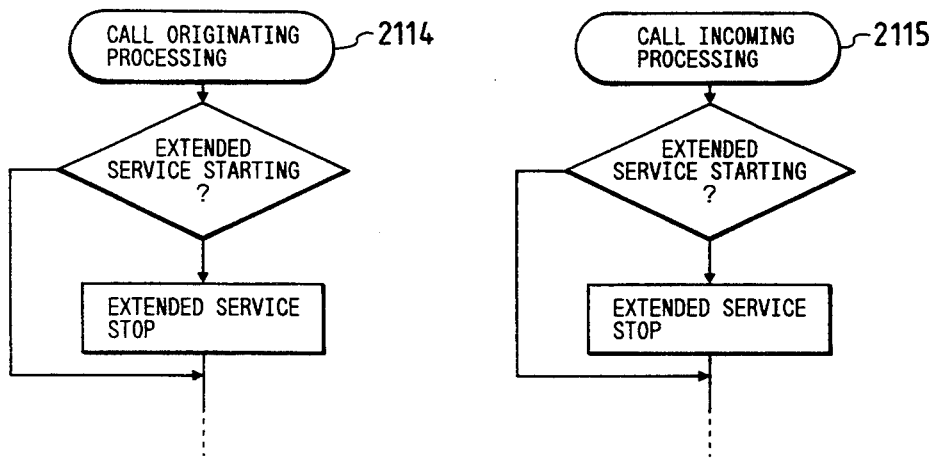

FIG. 29

| ITEM NUMBER | STATE | START | STOP | PROCESSING CONTINUE |
|---|---|---|---|---|
| 1 | NO COMMUNICATION | YES | YES | YES |
| 2 | CALL CONNECTION PROCESSING | NO | — | NO |
| 3 | CALL DISCONNECT PROCESSING | NO | — | NO |
| 4 | COMMUNICATION | YES | YES | YES |

TELEVISION TELEPHONE

BACKGROUND OF THE INVENTION

The present invention relates to a color moving picture television telephone which performs bi-directional simultaneous communication of voice, moving picture and data in real time, making use of a high speed digital communication network, especially to a combination type television telephone including a picture or video codec (coder-decoder) and a communication control circuit.

A color movable picture television telephone apparatus of a prior arrangement has a large video codec unit which is provided separately from the television telephone body, and both are connected by a cable. Also, a camera and a display are fixed to the body generally with the camera unit being fixed to the body and directed only toward a specific direction such that free adjustment of direction is not provided.

Also, the prior apparatus is not adapted for special application, such as transmission of a document and picture, and the camera is normally applied to take a photograph of personal figures. When taking a photograph of other than personal figures, the prior apparatus is not provided with a construction, such as stand etc., for supporting a camera with the camera being freely removed by itself. Further, there is an apparatus having a construction providing a plane mirror in front of the camera so as to take a photograph of documents and pictures with documents or pictures being set on a platform (bottom part), but the camera has an integrated construction with a display. Fujitsu technical report 41. 3; , pp. 243-247 (May, 1990 edition) and Japanese patent application No. 2-39790 as well as Japanese patent application laid-open No. 2-22989, for example, are representative of disclosures of such apparatus.

Also, as a technique for improving man-machine interface of a color moving picture television telephone terminal in the prior art, the realizing of an operation supporting function using message indication function is disclosed in the "International Communication Research No. 135 (January 1988) page 33, clause 4.1, item 5, issued by the foundation KDD engineering and consulting. Also, the changing of a dip switch or a jumper plug is carried out to adapt for the system registration and setting and realization of a maintenance function, as described in page 34, clause 4.2 of the above literature.

In the prior art as above described, there are problems that mobility and portability are not considered, and the phase of installation of the apparatus is limited and movement is difficult. Moreover, many cables are connected to the body, so that the use as a terminal apparatus is not convenient.

Further, when document information such as documents or photographs is transferred, since documents are held up by hand in front of a camera to take a photograph in accordance with the set position of the camera direction at the time of conversation, stable transmission of characters with good fineness is not possible because of movement of the document due to hand vibration or the like. Moreover, concerning a television telephone having a looking-down construction at the camera unit, since the camera unit is simply directed downwards, the document must be set reversely in the longitudinal direction with respect to the direction viewed by the sender. Therefore, there is a problem in that a sender can not identify the document simultaneously and naturally. Moreover, with regard to an adjustment mechanism for the heights and angles of the camera display of the body, there is only one movable point between the body and the camera display. Therefore, there is a problem in that arbitrary heights and angles can not be set. Further, the camera unit is always directed to the user side, and even when pictures are not desired to be sent (e.g., used as digital telephone), the camera by its construction is operational and thus there is a problem that an image of being watched cannot be removed.

In a picture/voice multiplex transmission mode, a transferring rate of each source signal is fixed and only data of certain quality of a voice or a picture can be transferred. Further, there is no external input/output function as a multi-media terminal including all signals of voice, picture and data, with only a function as a television telephone terminal, thereby lacking in extendibility. Also, the function as a television telephone terminal always accompanied by picture transmission is merely realized, not by communication control which can be used as a mere digital telephone terminal, and selection of a particular function among many functions is lacking.

Additionally, at the color moving picture television terminal in the prior art, firstly, since communication between terminals of the same kind or the same product is only considered, and since many register and setting items necessary for the color moving picture television telephone terminal are almost all previously registered and set in the terminal, it is therefore hardly necessary that the user frequently register and change the communication mode or the operation of the color moving picture television telephone terminal. However, according to the various developments in the technique and the standardizing activity, the color moving picture television telephone terminal can be connected to a conventional analog telephone, a digital telephone using digital communication lines, various kinds of television telephone terminals and teleconference terminals, each having many different register and setting items, so many register and setting items. Secondly, it is necessary to consider security and concealment in the setting and register operations from the status of communication terminals. Thirdly, television telephones or television telephone operating members are used in many cases by being placed on desks, and therefore depending on the use condition the dimensions of the operating members carrying out the man-machine interfaces are somewhat limited, and the numbers of input keys and dimensions of the keys are subjected to the consideration of manipulatability. Fourthly, the operating members of television telephones are required to be man-machine interfaces similar to operating methods for conventional analog telephones due to the status of telephones, and in order to provide users with increased multiple functions comparing to conventional analog telephones without confusion, it is necessary to provide standardized man-machine interfaces. Fifthly, the numbers and domains of characters and figures (pictures) which can be indicated on the display are finite, and the characters and figures are indicated on moving pictures with multiplication at the time of picture reception and at the time of monitor indication, and therefore it is necessary to consider the positions of indication and the multiplying method. Sixthly, for the transmission timing of pictures, privacy and security must be considered, and it is necessary to reflect the intentions of the users in each communication.

SUMMARY OF THE INVENTION

It is therefore an object of the present invention to provide a combination type television telephone solving the above-mentioned problems and having good convenience, mobility and usage due to the integration of the television telephone.

Another object of the present invention is to provide a combination type television telephone in which wirings within the apparatus are simplified and external connection wirings are reduced.

A further object of the present invention is to provide a combination type television telephone which is suitable for transfer of both personal figures and documents or pictures, and for multiple functions as a multi-media terminal.

Another object of the present invention is to provide a combination type television telephone where the manipulatability and function extendibility is improved and a man-machine interface similar to that of a conventional telephone is realized.

Still another object of the present invention is to provide a combination type television telephone which can improve security by classifying of extended service functions, thereby enabling omission of many keys and setting switches, and which can be easily extended.

A further object of the present invention is to provide a combination type television telephone which reflects the intention of users to transmit pictures accurately and can protect privacy.

In order to attain the foregoing objects, a television telephone of the present invention includes a movable head section having an image input unit for inputting images and a display for displaying picture signals; a bottom section having a communication control unit for multiplexing coded information of voices and pictures and for sending and receiving the information to a communication network, a power supply, and a telephone controller for controlling sending/receiving function and a key panel unit; and a support section including a picture encoding and decoding unit composed of a picture encoding circuit for encoding image input signals and a picture decoding circuit for decoding received picture signals, wherein the support section is provided for connecting and supporting the head section and the bottom section and for supporting the head section.

The television telephone of the present invention includes a communication control unit for carrying out multiple separation control of voices, pictures and digital data and communication control of digital communication lines; a key panel unit for inputting selection of a dial and other functions; a telephone control unit for controlling sending/receiving function and the key panel unit; a camera unit for inputting images; a display unit for outputting images; and a picture coder codec unit composed of a picture encoding circuit for encoding image input signals and a picture decoding circuit for decoding received picture signals, wherein each component part of the communication control unit, the key panel unit, the telephone control unit, the camera unit, the display unit and the picture coder unit is integrated, and connection wiring between each component part is carried out within the integrated device and connection wiring outside the integrated device is provided in a cord for digital communication lines.

For example, a picture encoding circuit, a picture decoding circuit and an analog image signal processing circuit in a picture codec unit are each made into LSI, and circuit boards equipped with such LSI are made smaller to approximately one sheet of A4 size mainly accommodating surface package parts, and a communication apparatus control circuit is made into a one-chip LSI and communication control and telephone control are mounted on a circuit board of one sheet of A4 size mainly accommodating surface package parts. Included with these circuit boards, a small switching source, a small color camera to which ½ inch CCD is applied and a general-purpose liquid crystal display panel of small size (5 inches) are integrated and packaged within one apparatus. The apparatus is of L-shape, and a circuit board accommodating a power supply unit, a communication control unit and a telephone control unit is installed at the bottom side of the L-shape apparatus and a circuit board of a picture codec unit is installed at the longitudinal side of the L-shape respectively, and a camera unit and a display unit including a liquid crystal type panel are mounted on the top side of the L-shape. All connection wirings between each part are accommodated within the apparatus, and only two cords, that is, a cord for commercial power supply and a cord for digital communication lines are connected to the outside.

Further, in accordance with another feature of the present invention, a camera unit including a small color camera is moveable downwardly to the front side independently of a display unit so that the direction of the camera is set downwards vertically, and a switch is installed at a sliding part and is closed when the camera unit starts the downward movement independently. Depending on the condition change signals of the switch, the data output (read out) of a frame memory in a picture encoding circuit of a picture coder unit is controlled so as to reverse the usual scanning direction from left-upper side to right-down side into the direction from right-down side to left-upper side, that is, so that the sending-out signal becomes point symmetry of 180°. Also depending on the condition change signals of the switch, output signals with the scanning direction reversed are distributed by an image processing circuit and inputted into a partial screen processing circuit, and a monitor screen is superposed on a part of the reception screen displayed on the display unit. A control program is set such that when the camera unit is returned to the original position and the condition change signal of the switch is received and the above-mentioned control is stopped, the condition existing before the camera unit is moved downwardly is restored.

The apparatus is of the present invention is configured in an L-shape, and a camera unit and a display unit are installed on the top side of the L-shape, and a joint part is made movable and the bottom side and longitudinal side of the L-shape are made movable. Further, flexible cables are applied to connection between units mounted within each part.

According to another feature, a band of 64 kps is divided into 8 channels in every 8 kps, and it is set arbitrarily by a program control to which channel among the 8 channels, each signal of voice, picture and data should be allotted.

In accordance with the present invention, a general-purpose connector is used as an external input/output terminal and each of a voice input terminal, a voice output terminal, an image input terminal, an image output terminal, a serial data input/output terminal and a parallel data input/output terminal is mounted on the rear surface of the body, and voice input signals and voice signals from a transmitter are inputted to an analog switch of 2 inputs and outputted to a voice input circuit of a telephone control unit, and image input signals are inputted to a video switch of 2 inputs and inputted to a picture encoding circuit. Each route change is selected by a control key in a key panel unit and route control is effected by a microprocessor on receiving a key signal, and a device having ability of transferring serial signals is applied to the microprocessor and a serial signal input/output terminal is connected through an input/output drive circuit to an external serial data input/output connector, and a data input/output signal terminal of a communication control unit is connected through the input/output drive circuit to an external parallel data input/output connector. Reception voice signals to the receiver are distributed and connected to the voice output terminal, and reception image signals to the display unit are distributed and connected to the image output terminal.

The present invention also provides that a video or picture codec unit, a camera unit, a display unit are integrated, and coupled with the body including a communication control unit, a telephone control unit, a power supply unit by connection of detachable cables, and both can be attached and detached constructionally.

Additionally, to solve the first, the second, the third and the fourth problems as mentioned above, actual keys are not provided for function selection, registration and inputting of set items respectively, but rather starting keys for function selection, registration, inputting of set items and extended service function are directly selected in function and registered and inputted in set items, preferably in the television telephone operation, with keys allotted by conventional telephones and extended telephones are realized by the actual keys. Further, telephone functions and television telephone functions to be newly provided and registration and setting items required in the operation of the television telephones are indicated by a plurality of pictures or characters on the display b starting the extended service function, and means for selection by inputting keys corresponding to the arrangement of the plurality of indicated pictures or characters is provided, ind the number of keys adapted by provision of the extended service function or arrangement being composed of selecting means hierarchically is suppressed to suitable number.

For solving the fifth problem described above, respective indication areas are provided which are not overlapped, or indications having few occasions for overlapping in the operation actually, such as the communication operation guidance of a television telephone, the advice indication, the input confirmation indication, indication by the extended service function and the like, are taken in the same area and utilized with the processing execution limitation and the time dividing. Also for solving the sixth problem, an LED indicating information of picture transmission mode with a picture key as an actual key is provided, and the picture key is inputted during no communication or at the communication state to disable the picture transmission during the transmission thereby the picture transmission mode can be changed. Additionally, pictures are transmitted automatically at the automatic picture transmission mode in the communication state to enable the picture transmission and pictures are transmitted by inputting the picture key at the manual picture transmission mode. Also, the picture transmission mode registered by the extended service function is set again at the time of finishing the communication.

In accordance with the present invention an extended service function is provided so that the number of inputs allotted to actual keys or switches can be reduced a great deal, and inputs of the extended service are made stratums, thereby the extension of the keys is also adapted without increase of the actual keys or switches. At the time of contents considering the security in the inputs of the extended service function, enough consideration can be done by carrying out the input check and input limitation. The number of inputs is reduced a great deal so that dimensions of the operating members can be suppressed, and the input keys at the time of starting the extended service function is suppressed to specific keys, thereby adequately standardized man-machine interfaces can be provided.

When the communication operation guidance of the television telephone, the advice indication, the input confirmation indication and the indication by the extended service function are taken on the same area and the start keys of the extended service function are inputted, the extended services can be started independently of the communication period or non communication period. However, during the communication start processing or when the communication start processing is begun, and during the communication finishing processing or when the communication finishing processing is begun, the starting of the extended service function is inhibited, and during the starting, the starting is compulsorily stopped. Consequently, the communication operation guidance, the advice indication, the input confirmation indication and the indication of the extended service function, which would concentrate almost during the communication start processing and during the communication finishing processing, can be utilized in the time dividing.

The registration of the picture transmission mode and the picture key are provided and means for indicating information of the picture transmission mode at present is provided, and in the state to disable the picture transmission, the picture transmission mode can be changed freely using the picture key, thereby on confirming the opposite party by voice or the like, decision can be made as to whether the picture should be transmitted or not, and the intention of the user can be reflected. Depending on the use purpose, it is frequently requested that pictures are transmitted automatically while the pictures can be transmitted. Then the automatic transmission mode can be previously registered by the extended service function. Also in this case, the transmission rejection of pictures in every communication becomes possible by input of the picture key, and the picture transmission mode registered at the time of finishing the communication is set again, thereby a request for versatile picture transmission can be dealt with.

These and further objects, features and advantages of the present invention will become more obvious from the following description when taken in connection with the accompanying drawings which show for purposes of illustration only, several embodiments in accordance with the present invention.

BRIEF DESCRIPTION OF THE DRAWINGS

FIG. 16 is a diagram for a still picture transmission system in a picture codec unit of an embodiment of the invention;

FIG. 28 is a flowchart showing key input processing according to the invention;

FIG. 29 is a diagram showing the start, stop and processing execution limitation conditions of extended service function according to an operation state of a television telephone according to the invention;

DESCRIPTION OF THE PREFERRED EMBODIMENTS

Figure 1:
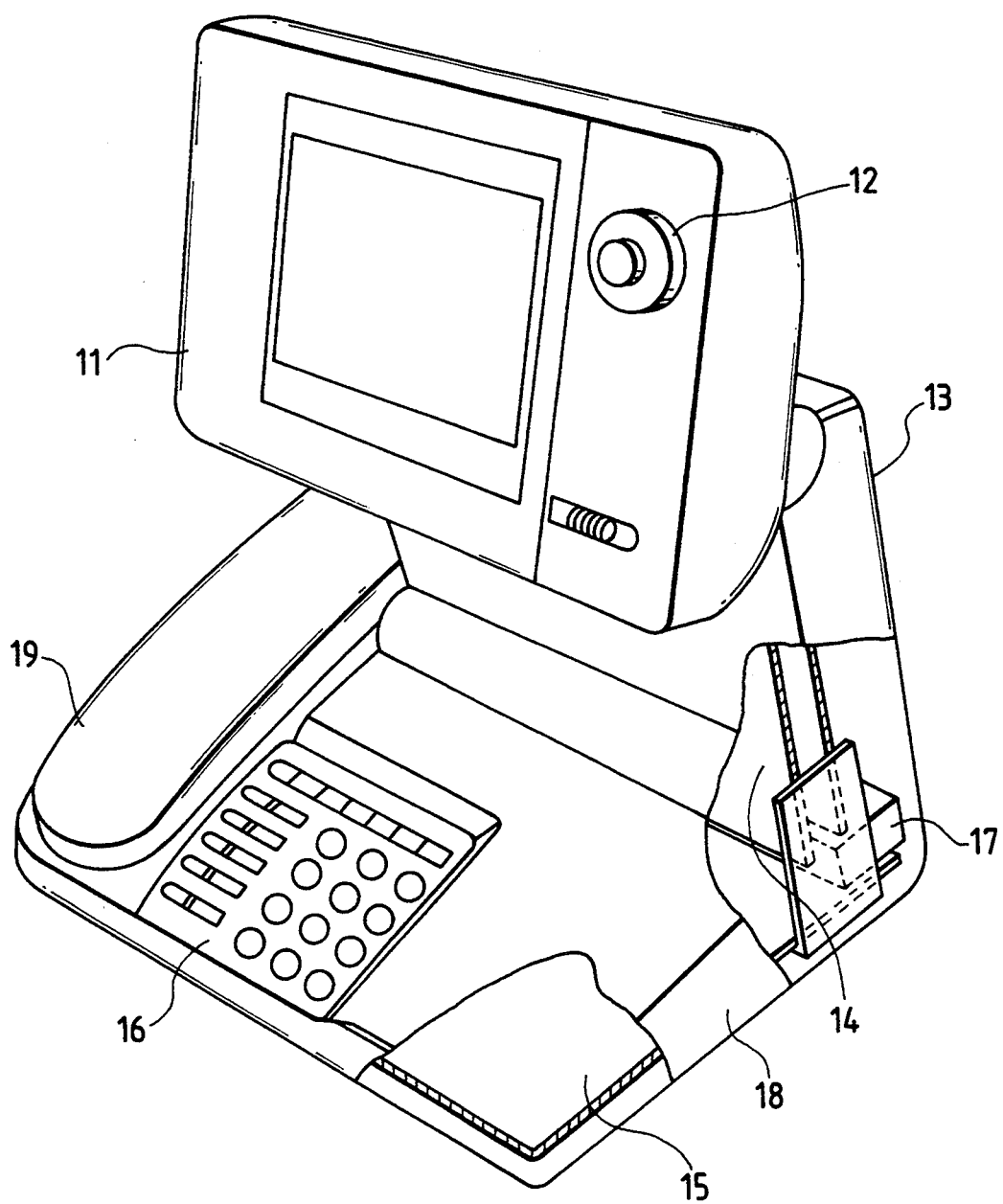
FIG. 1 is generally a perspective view of an embodiment of the present invention.

Referring now to the drawings FIG. 1 shows the construction of a combination type television telephone of the present invention which has an L-shape. In FIG. 1, a head section, that is, a top side of the L-shape has a display portion 11 and a camera portion 12. Also, a support section, that is, the longitudinal side of the L-shape configuration has a picture codec portion unit 13 including a picture encoding circuit and a picture decoding circuit, and a picture codec substrate 14. Further, a bottom section (base), that is, the bottom side of the L-shape has a communication apparatus control substrate 15 including a communication control circuit and a telephone control circuit, a key panel portion 16 including a telephone function key, a television telephone control key and an indication key, a power supply unit 17, a body 18 with external input/output terminals and a handset 19.

Figure 2:
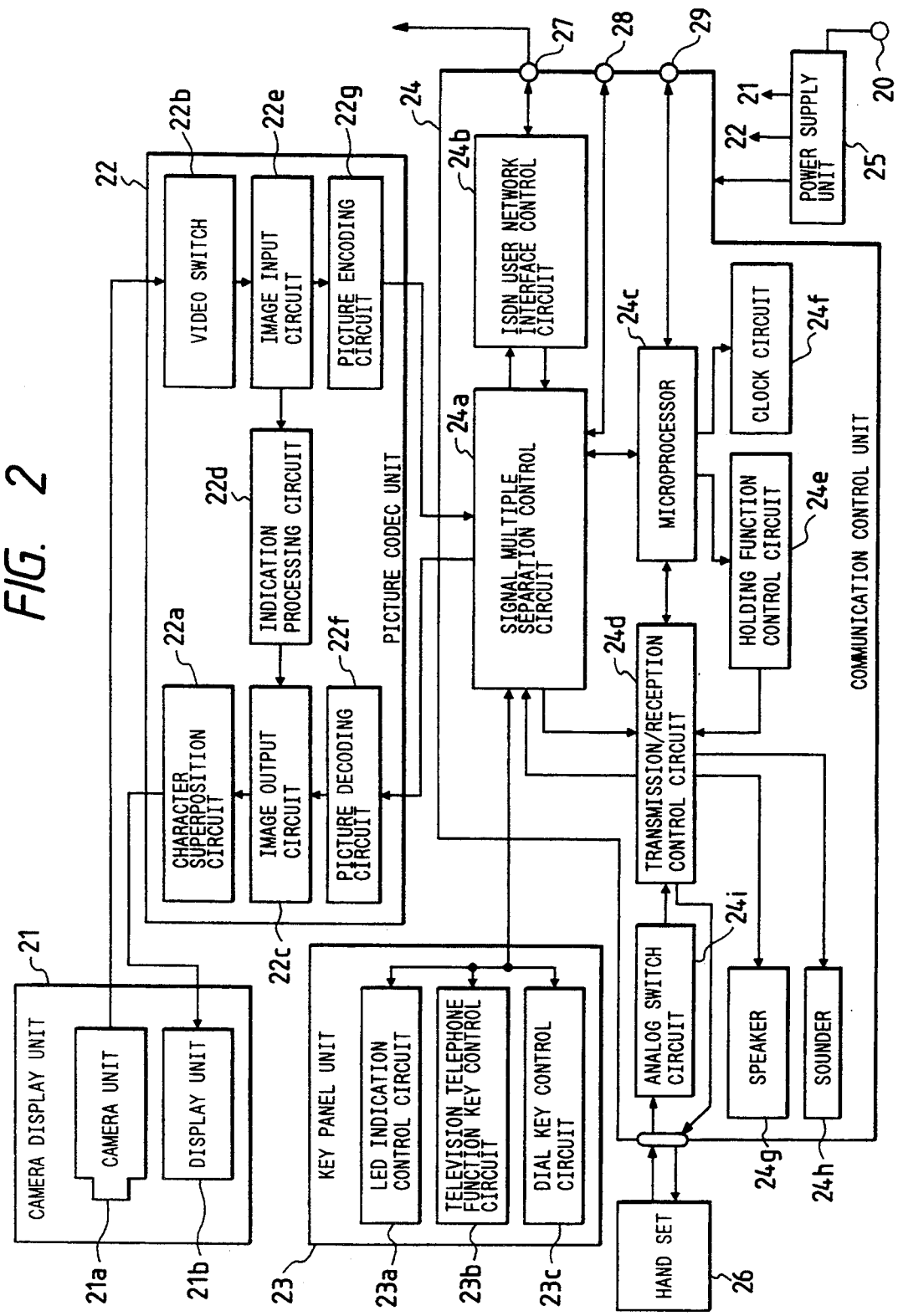
FIG. 2 is a block diagram of an embodiment of the invention.

The block diagram constitution of the combination type television telephone of the present invention is illustrated in FIG. 2. A camera display unit 21 includes a camera unit 21a and a display unit 21b. A picture codec unit 22 includes a character superposition circuit 22a, a video switch circuit 22b, an image output circuit 22c, an indication processing circuit 22d for controlling indication system of an indication screen of the display unit, an image input circuit 22e, a picture decoding circuit 22f for reproducing received digital picture signals as image signals, and a picture encoding circuit 22g for transforming the image signals outputted from 22e to digital signals into the communication control unit. A key panel unit 23 is constituted by an LED indication control circuit 23a, a television telephone function key control circuit 23b, and a dial key control circuit 23c. A communication control unit 24 is constituted by a multiplex separation control circuit 24a, an ISDN user network interface control circuit 24b, a microprocessor 24c for controlling every part within the apparatus, a transmission/reception control circuit 24d, a holding function control circuit 24e, a clock circuit 24f, a speaker 24g, a sounder 24h for generating signal tones, and an analog switch circuit 24l. A power supply unit 25 obtains commercial power from the outside through a commercial source plug 20, and supplies constant voltage to the units 21, 22 and 24. A handset 26 is connected through a cable to the body. There is also provided an ISDN user network interface line connection part 27, a parallel data input/output terminal 28, and a serial data input/output terminal 29 which is mounted as an input/output connector on the body.

Color image signals obtained from the camera unit 21a are outputted to the video switch 22b. The video switch 22b is controlled by the microprocessor 24c, and selects the external image input signal or the image signal of the character superposition circuit 22a and outputs the selected signal to the image input circuit 22e. The image input circuit 22e distributes and outputs the output signals of the video switch 22b to the indication processing circuit 22d and the picture encoding circuit 22g respectively. Image signals inputted to the picture encoding circuit 22g are encoded to digital picture signals compressed at the data transfer rate suitable for transmission band of communication lines according to the system based on the CCITT recommendation H. 261 at the picture encoding circuit 22g, and then are outputted to the signal multiplex separation circuit 24a. Accordingly, camera image signals or external image input signals are selected, and the selected signals are sent out as digital picture signals to the ISDN user network interface.

Digital picture signals outputted from the picture signal system output terminal of the signal multiplex separation control circuit 24a are inputted to the picture decoding circuit 22f, and decoded to analog image signals in a manner opposite to the operation of the picture encoding circuit 22g according to the system based on the CCITT recommendation H. 261, and then are outputted to the image output circuit 22c. The indication processing circuit 22d transforms image signals (sent-out image signals) being outputted from the image input circuit 22e into a mirror image or screen in point symmetry rotated by 180°, and then outputs this image to the image output circuit 22c. The indication processing circuit 22d is controlled by the microprocessor 24c, and selects the type of the screen transformation. The image output circuit 22c inputs image signals outputted from the picture decoding circuit 22f and outputs such signals to the character superposition circuit 22a, and is controlled by the microprocessor 24c and selects and outputs the partial screen indication and the normal full screen indication. In addition, the picture being outputted to the partial screen area is an output signal of the indication processing circuit 22d.

The character superposition circuit 22a inputs image signals outputted from the image output circuit 22c and outputs such signals to the display unit 21b and carries out the screen indication, and is controlled by the microprocessor 24c and superposes registered figures, characters or the like on the output image signals of the image output circuit 22c and carries out the screen indication. Thereby, the received digital picture signals are decoded and reproduced as analog image signals, and moving pictures are displayed on the display unit. In the screen indication, monitor or figure/character indication is possible by a partial screen.

The signal multiplex separation control circuit 24a has input/output function of digital signals in three systems, voice, picture and data, and multiplexes digital signals of these three systems and sends them as digital signals corresponding to 2B (2×64 kbps), and receives digital signals corresponding to 2B and separates them into digital signals in the above-mentioned three systems. Further, as the signal transfer rate in each system can be set arbitrarily in the range with the sum of rates corresponding to 2B, that is, less than 128 kbps, for example, bi-directional multiplex communication control with the transfer rate variable including the combination of transfer of voice signal 56 kbps, transfer of picture signal 64 kbps and transfer of data signal 8 kbps becomes possible. The transfer system carries out communication control by the system based on the CCITT recommendation H. 221 and H. 242.

Further, the function control of the picture codec unit 22 and the lighting control of the LED indication control circuit 23a and the switch control of the video switch 22b and the analog switch circuit 24i are controlled by the microprocessor 24c.

The ISDN user network interface control circuit 24b has an output/input signal terminal to the input/output terminal corresponding to 2B of the signal multiplexer separation control circuit 24a and an input/output terminal for ISDN user network interface, inputs the digital signals corresponding to 2B involving each of signals of voices, pictures and data multiplexed at the circuit 24a, multiplexes D-channel (16 kbps) signals being line control signals, outputs signals corresponding to ISDN fundamental interface 2B+D into the network, inputs signals corresponding to 2B+D from the network, and separates signals corresponding to 2B and outputs them to the circuit 24a. Communication control for call to, connection with and release etc. for the partner side terminal connected through the network is controlled by the ISDN user network interface control circuit 24b applying the D-channel signals.

The microprocessor 24c has a microprogram in memory, and carries out the function control of the picture codec unit 22 through the signal multiplex separation control circuit 24a, the input/output control of the key panel unit 23, and hardware control, that is, setting and confirming of the multiple separation control of three signals of voices, picture and data by 24a etc., and also carries out man-machine interface control, that is, message output onto the screen etc. A voice signal processing circuit 24d inputs voice signals from the signal multiples separation control circuit 24a and decodes analog voice signals and outputs them to the analog switch circuit 24i, and encodes analog voice signals inputted from circuit 24i and outputs digital voice signals to circuit 24a. A hold tone generating circuit 24e outputs hold tones to its own terminal receiver and a partner terminal receiver if the holding state is set during communication. A clock circuit 24f outputs data of the present date and the present time, and informs the microprocessor 24c of the parameter showing the time and carries out the present time indication and the communication time indication. Also, a speaker 2g is provided and when a speaker key installed on the key panel is pushed down or depressed, the circuit 24d receives control of the microprocessor 24c and sets the voice signal output route to the speaker output and outputs the received tones to the speaker 24g. There is also provided a sounder 24h for generating calling tones, and a circuit 24i switches sent signals or external voice input signals according to control of the microprocessor 24c when the voice switching key installed on the key panel is pushed down, and selects the signal source and outputs it to the circuit 24d.

Figure 3:
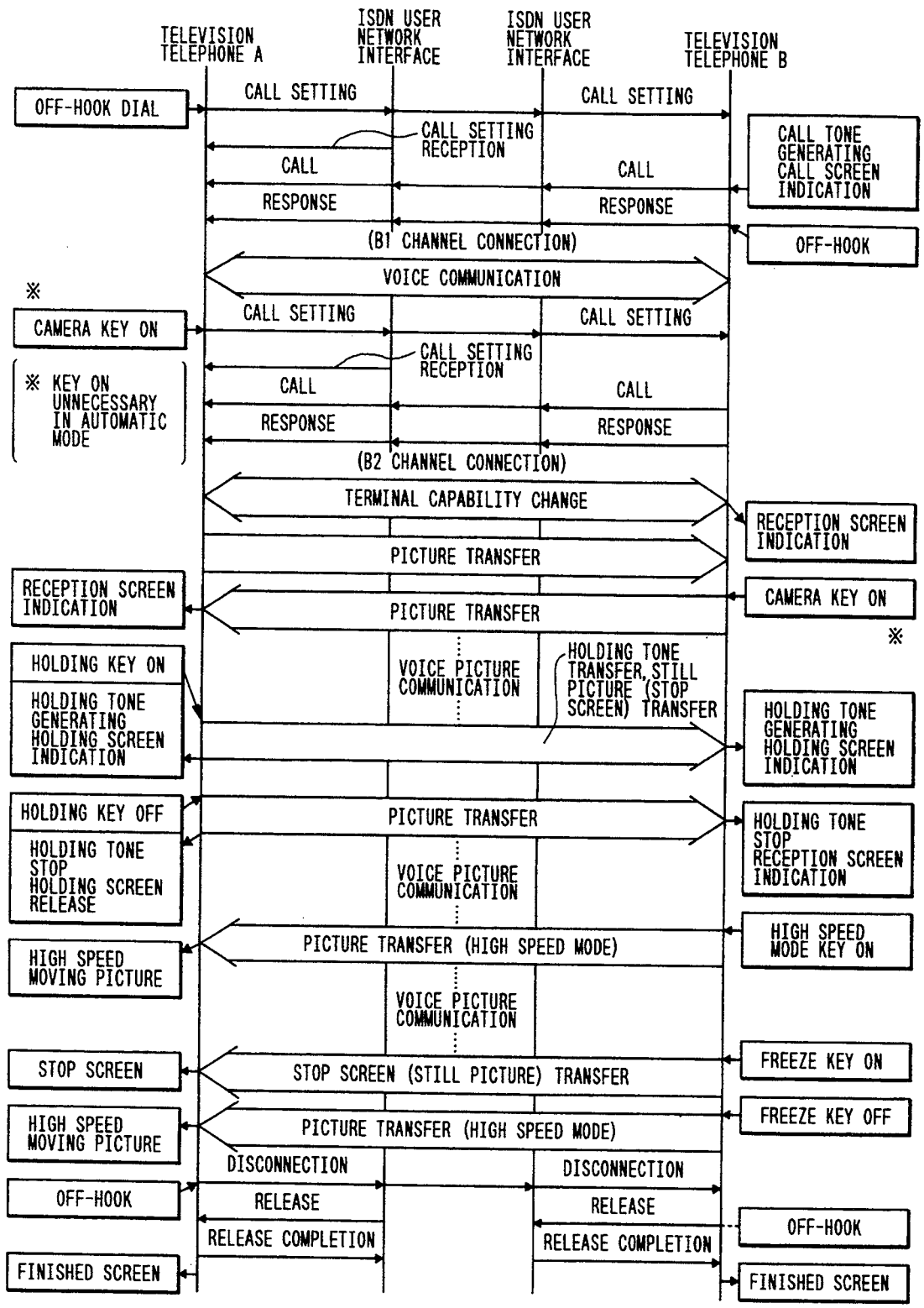
FIG. 3 is a diagram showing an operation sequence of an embodiment of the invention.

FIG. 3 shows the operation sequence when two sets of combination type television telephones according to the present invention are used and the following describes the communication procedure and every functional operation for carrying out the voice/picture communication. The television telephones A and B are on the sides of sending end and receiving end respectively. Each apparatus is connected to an ISDN user network interface, and carries out communication therebetween through the network. Fine arrow mark shows the communication control by D-channel signals, and thick arrow mark shows that by B-channel signals.

First, the user picks up the handset at the television telephone A and hooks off, and dials the television telephone B so as to initiate the connection therebetween through the network. Call setting control is carried out by the D-channel signal at the ISDN user network interface, and call control of the television telephone B is carried out through the network and the call tone is outputted to the receiver of the television telephone A. The other user picks up the handset on the B side and hooks off, and sends out the answer signal from the B side to the network and from the network to the A side, and connects the first B channel and controls so as to establish the condition ready for voice communication.

Thereafter, in order to carry out picture communication, the camera key installed on the key panel at the A side is pushed down, thereby the second B channel is connected following the procedure by the D-channel signal similar to the preceding first B channel connection. Under such condition, on the second B channel, setting and confirmation of the picture encoding and decoding capability etc. of the A and B terminals are carried out, and picture signals are transferred from the A side to the B side, and the received picture signal is decoded at the B side and displayed on the display unit. The camera key is pushed down on the B side as well, a picture signal provided by encoding the camera image signal on the B side is transferred by the second B channel. This results in obtaining voice/picture communication including the moving picture mutually and simultaneously between the television telephones A and B.

In each television telephone, a picture for sending-out is registered and set by microprogram to be connected up to the second B channel automatically without using key operation, and can be raised up to the voice/picture communication condition without the control key operation. When the camera key is pushed down again during the voice/picture communication, the sending-out of the camera image signal is thereby stopped from that time, and operation is effected without the picture indication on the display unit of the television telephone at the partner side. When the holding key installed on the key panel is pushed down during the voice/picture communication, hold tones are thereby sent out by the first B channel and hold pictures (still pictures at the time of the holding key turn-on) are sent out by the second B channel respectively to the television telephone at the partner side, and in the television telephone on the side of carrying out the holding operation, hold tones are outputted to the receiver and hold pictures are outputted and displayed to the display unit. When the holding key is pushed down again under the holding condition, the voice/picture communication condition before the holding operation is thereby recovered.

When the high speed mode key installed on the key panel is pushed down during the voice/picture communication, use of the screen fineness and the encoding transformation speed in the encoding circuit of the picture codec unit as parameters, two kinds previously registered picture quality (moving picture of rough quality at high speed and moving picture of high quality at low speed etc.) are selected, and the picture quality to be sent out can be changed. Also, when a freeze key installed on the key panel is pushed down during the voice/picture communication, sent out pictures are stopped at the time of operating the freeze key, and the pictures under that condition are sent out as still pictures. Further, when the freeze key is pushed down again, the still picture sent-out condition is released, and the voice picture communication condition in the previous moving picture is recovered.

When the television telephone A or B performs on-hook with the handset returned to the body during the voice-picture communication, the procedure for communication disconnection and release is carried out in the D channel, and the communication is finished. At the time of communication finishing, a picture display indicating the finishing is carried out in each display unit at the A side and the B side, and the initial condition is recovered. As to the communication finishing procedure, irrespective of whether the A side or the B side is on-hooked earlier, the processing is performed automatically.

Figure 4:
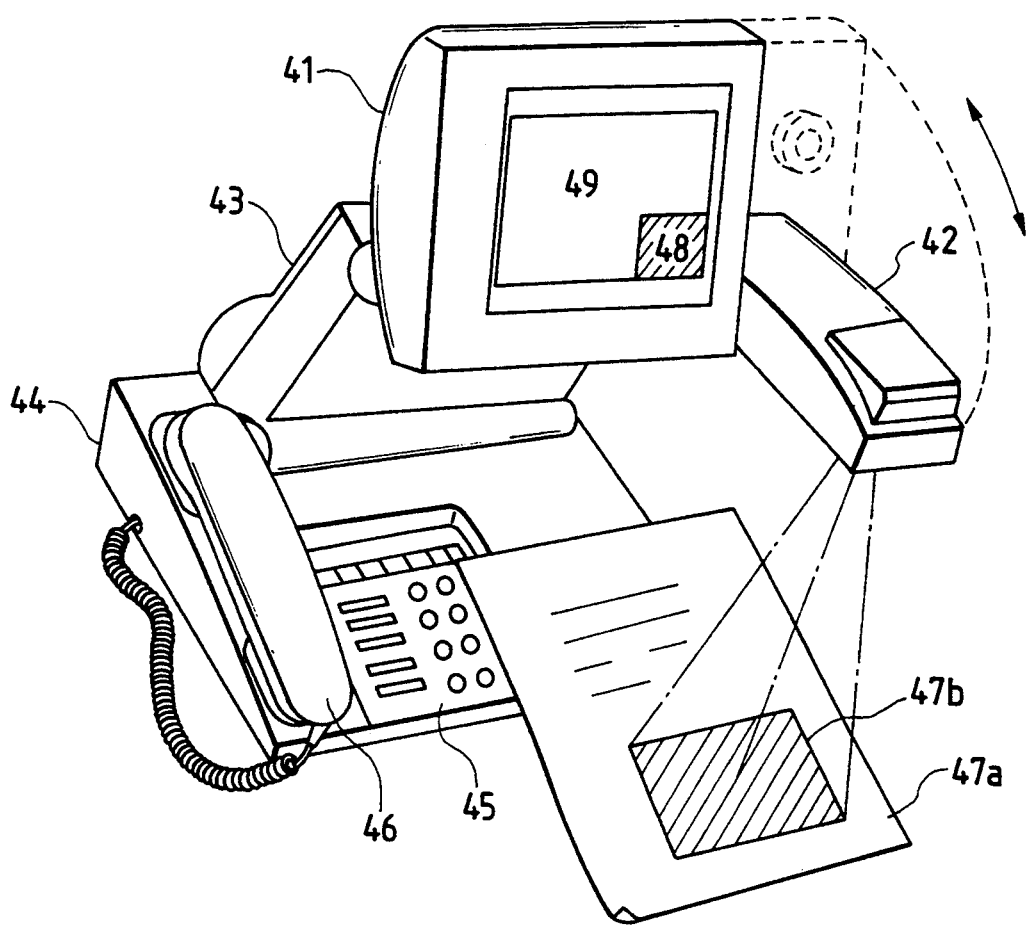
FIG. 4 is a perspective view of an embodiment of the invention when transferring document/picture information.
Figure 5:
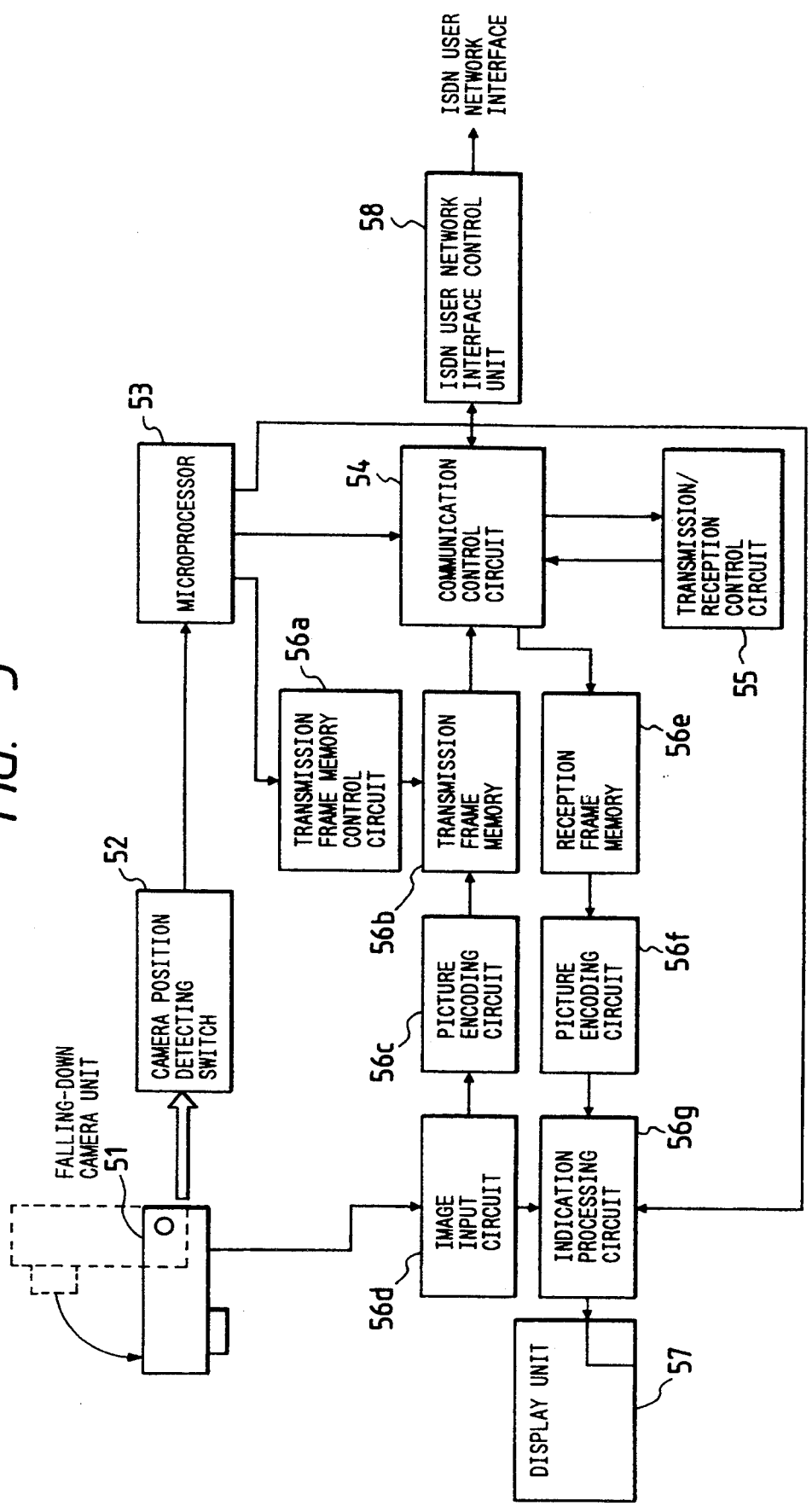
FIG. 5 is a block diagram of the document picture transmission function of an embodiment of the invention.
Figure 6:
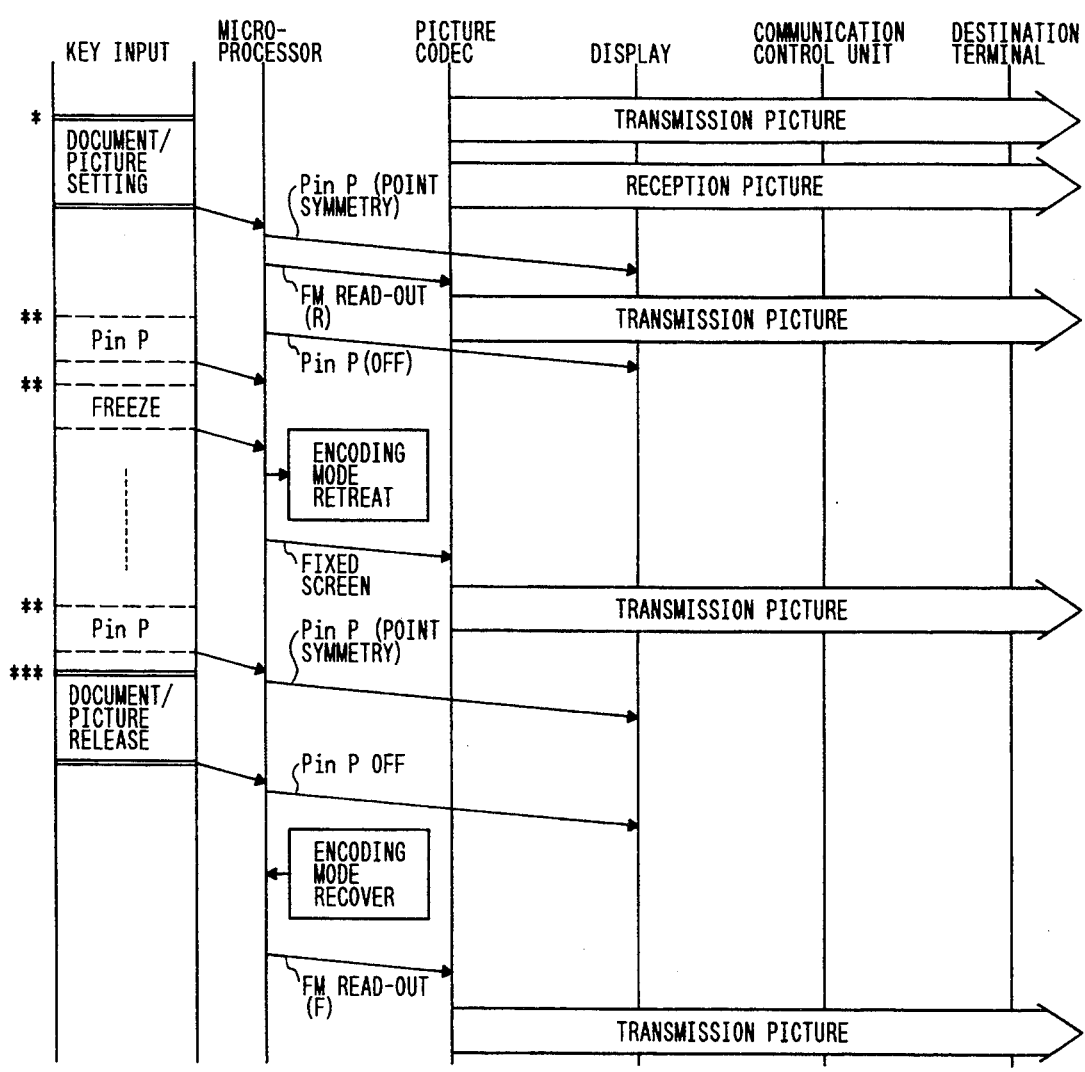
FIG. 6 is a diagram showing an operation sequence during document/picture transmission.

FIG. 4 shows a document/picture transfer mode of the television/telephone of the present invention with FIG. 5 showing a block diagram of the apparatus and FIG. 6 showing the operation sequence. When the camera unit is moved downwardly to the front side of the apparatus and the camera direction is set downwards vertically, a switch mounted on the support section of the camera unit is turned on, and the setting of the camera position to the document picture transmission mode is informed to a microprocessor 53 at the body side. The camera unit has a photographing area 47b of the document 47a and the direction of reading-out (data sending-out) of a frame memory in an encoding circuit 56c of a picture codec unit is set in point symmetry of 180° with respect to the normal state of the picture and is sent out, and the partial picture indication is displayed automatically on the display and further it is controlled to be in point symmetry of 180° and is outputted to the display 57 wherein it is displayed in superposed form as a picture 48-in-picture 49, as shown in FIG. 4.

Figure 7:
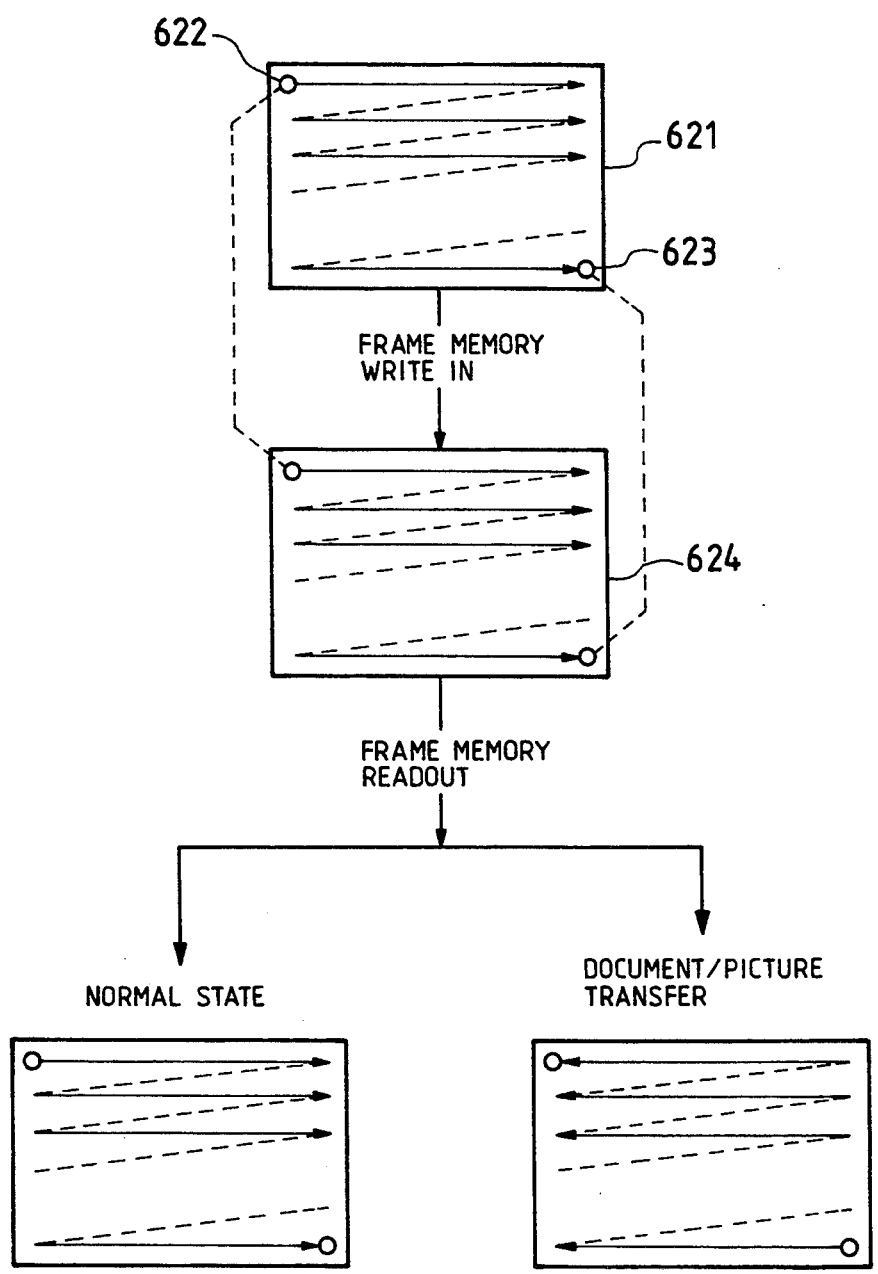
FIG. 7 is a diagram showing the reading-out direction during a normal state and during document/picture transfer of a frame memory.

The normal read-out direction of the frame memory and the read-out direction of the frame memory at the time of sending out the picture in point symmetry of 180° during the document picture transfer are shown in FIG. 7. A camera image 621 is provided and there is provided a beginning point 622 of image signals and an end point 623 thereof. A frame memory 624 stores digital signals after A/D conversion of the image signals. The camera image 621 is scanned sequentially from the beginning point 622 to the end point 623, and sequentially written into the frame memory 624.

According to this embodiment, since the camera which is utilized for conventional conversation can be also used commonly as a camera for documents and pictures, and the reversed photographing image due to the looking-down to the front side position of the camera can be automatically corrected by the picture codec section, there are effects in that the sender need not take the trouble to set the document with the top and the bottom reversed, but can confirm the document placed naturally.

Even if documents are not properly placed, a holder is mounted under the camera so that patterns and messages selected voluntarily by the user can be set. Therefore there are effects in that when the television telephone is used only in the telephone function, the user can use it without consciousness of the camera and without anxiety of being watched. Also there are effects in that by simple operation of replacing documents in the form of message cards, not only the securely fixed messages can be transferred to the partner, but also test patterns may be set and picture quality tests by transmission of picture signals through the picture codec unit can be carried out easily. As the camera unit has a camera unit mounting mechanism where the camera can be tilted solely to the rear side, the display is turned downwards and the diffused reflection of the display due to the external light is prohibited and the screen indication can be easily viewed.

Figure 8:
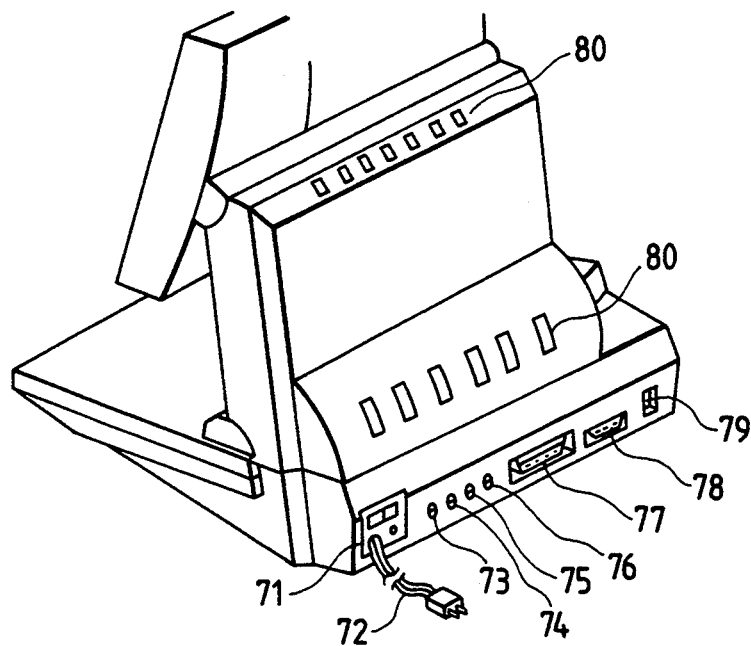
FIG. 8 is a rear perspective view of an embodiment of the invention.

FIG. 8 is a rear surface appearance view of a combination type television telephone of the present invention. The television telephone obtains commercial power source of AC, such as 100V as a power source to drive the apparatus from the outside through a commercial power source cord 72, and carries out the ON/OFF operation of the power source by a power source switch 71. An interface 79 for communication is provided, which carries out the connection with an exclusive cord and is in the cord connected condition normally. There is also provided a voice input terminal 73 to which voice signals (e.g., voice signals of a tape recorder) can be inputted through the exclusive cord; a voice output terminal 74 which is connected to an external speaker or the like through the exclusive cord, and can output and monitor received tones in parallel; an image input terminal 75 to which image signals (e.g., television image signals, external camera image signals) can be inputted through the exclusive cord; an image output terminal 76 which is connected to a television receiver or the like through the exclusive cord, and can output and monitor received pictures in parallel; a serial data input/output terminal 77 which is connected to a cable with connector of RS-232C interface, and can carry out serial digital data transfer with a personal computer or the like; and a parallel data input/output terminal 78 which is connected to a cable with connector of an exclusive digital interface, and can carry out control and link of an exclusive peripheral apparatus. Since the external input/output interfaces are all mounted to the rear surface of the body as shown in FIG. 8, when they are connected with external apparatuses, various wiring cords are assembled on the rear surface of the body and do not become complicated, and therefore system enlargement due to the clear wiring can be realized. Further, the picture codec unit is provided with openings such as slots 80 at the upper and lower portions thereof which enable cooling of such unit by natural circulation air flow therethrough.

Figure 9:
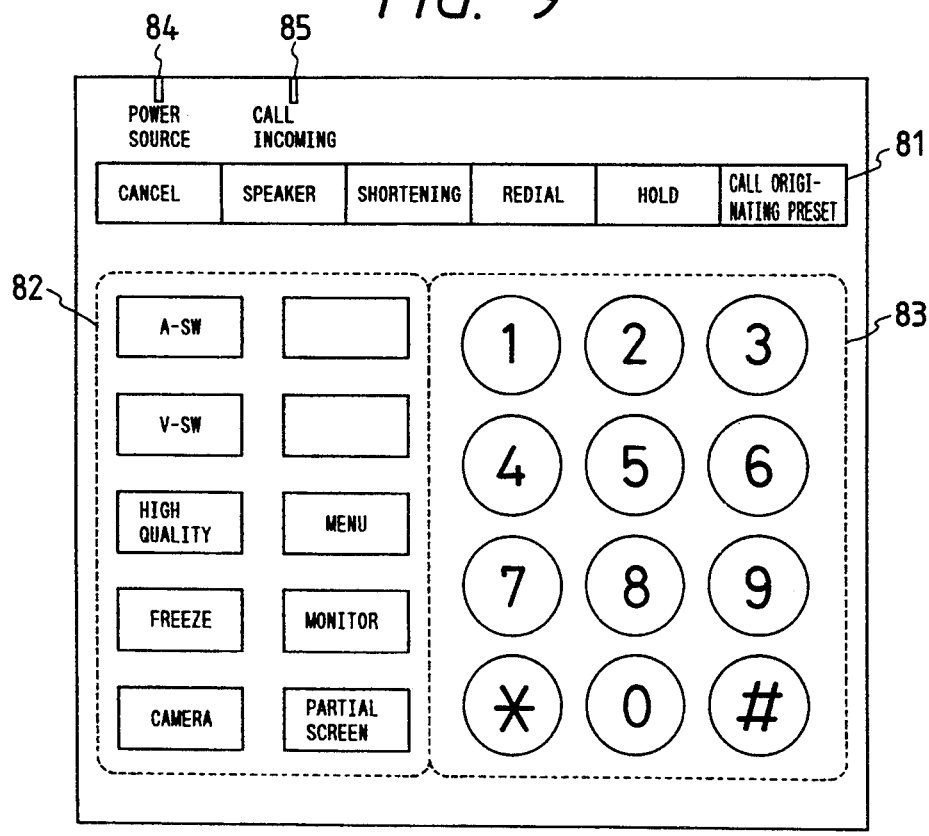
FIG. 9 shows a key panel unit arrangement of an embodiment of the invention.

FIG. 9 is an appearance view of a key panel unit of a combination type television telephone of the present invention. In order to facilitate the functional dividing, various keys are classified into three kinds of areas, that is, telephone function key 81, television telephone control function key 82 and dial key 83, and are positioned accordingly. In the television telephone control function key area 82, several functions are provided, that is, voice switching (A-SW), image switching (V-SW), picture quality switching (high quality), freeze and camera, in order to recognize the setting state in each function, LEDs for indication are mounted on the sharp head of the key unit so that the user can confirm the condition of each function easily. A power source ON/OFF indication lamp 84 is lit with the power source switch 71 being turned on, and is put out with the switch 71 being turned off or without power supply. Also a call incoming indication lamp 85 flashes with output of calling tone at the time of call incoming.

Figure 10:
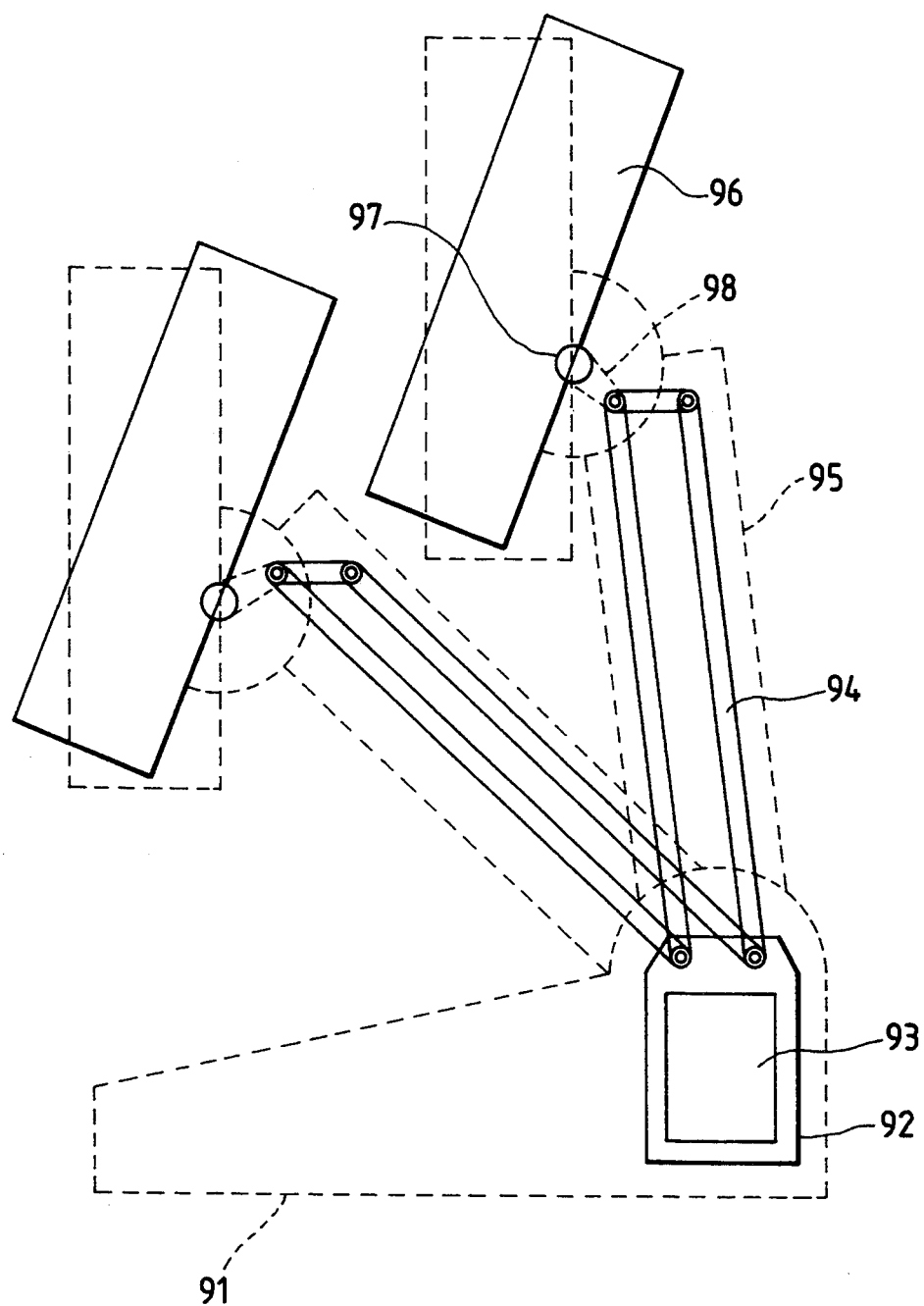
FIG. 10 is a side view of the internal construction of an embodiment of the invention.

FIG. 10 shows the connection construction of the television telephone for the body with each of the camera unit, the display unit and the picture codec unit. A base section 92 located on the rear side of the body (bottom section/base section) 91 is a base member which is integrated with the body and supports the upper members over the picture codec unit 95. A parallelogram support member 94 mounted to the picture codec unit has a construction in which two points below are mounted movably on two positions of the base, and move so that angle of an adjustment member 97 of the camera unit and the display unit becomes constant. When the picture codec unit is tilted forwards, a support member 98 moves so as to narrow the distance of longitudinal sides, and the upper side moves with its angle constant. Thereby as the support member for the camera unit and the display unit fixed to the upper side moves holding the constant angle, the heights of the surface of the camera unit and the display unit can be regulated, the angle being held constant.

Figure 11:
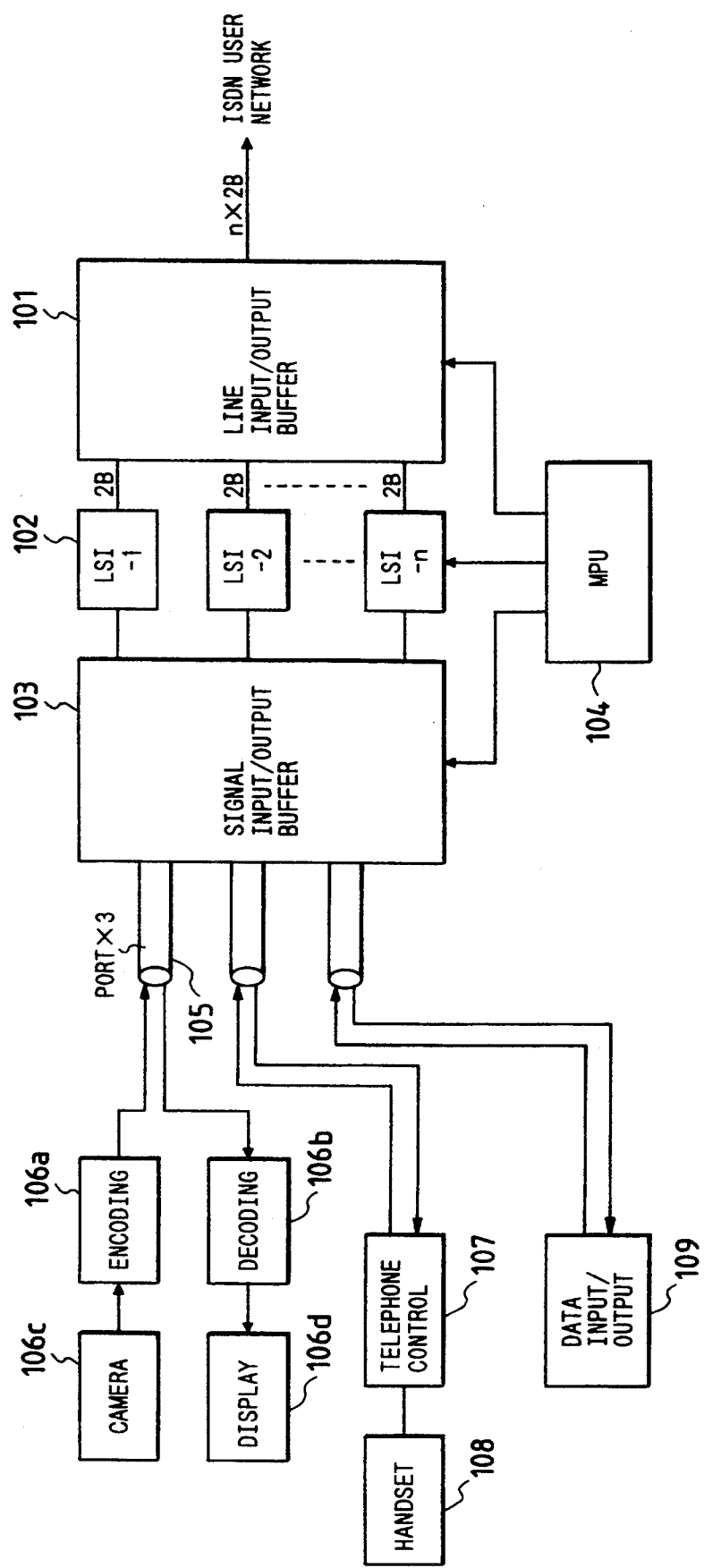
FIG. 11 is a block diagram for a high speed wide band type television telephone as an embodiment of the invention.

FIG. 11 is a block diagram of a combination type television telephone of the present invention, for a high speed and wide band, being applicable to n×2B communication line capacity, where a data multiplex separation control circuit for carrying out multiplex separation of the signal of 2B at the ISDN fundamental interface 2B+D into signals of three kinds, voices, pictures and data, is made LSI, and with n pieces of the LSIs in parallel, a line input/output buffer is installed at an ISDN interface and a signal input/output buffer is installed at three sorts of data input/output interfaces respectively, and these buffers are made controllable by a microprocessor MPU.

As shown in FIG. 11, there is provided a line input/output buffer 101, a data multiplex separation LSI 102, a signal input/output buffer 103, a microprocessor 104, a data port 105, a picture encoding circuit 106a, a picture decoding circuit 106b, a camera 106c, a display 106d, a telephone control unit 107, a handset 108, and a data input/output circuit 109. The line input/output buffer carries out signal input/output control of n×2B for an ISDN user network interface, and carries out multiplex separation control of n lines of data in 2B unit, and further corrects phase differences of signals of every B channel and is joined with LSI in 2B unit. LSIs 1—n separate-the three kinds of signals of voices, pictures and data from the 2B signals and output them, and input the three kinds of signals of voices, pictures and data and carry out the data multiplexing of signals of 2B. The signal input/output buffer inputs n lines of signals in three kinds, that is, voices, pictures and data, from n pieces of LSIs connected in parallel, and transforms the data of these n lines to one line of serial signal concerning voices, pictures, data and outputs the signal to each port of three lines, and transforms rates of each line of serial signals of voice, picture and data being inputted to each port of three lines, and outputs them as n lines of parallel signals to n pieces of LSIs connected in parallel. Therefore the sum of each transfer rate of voice signals, picture signals and data signals becomes n×2B. For example, if n=5, bidirectional simultaneous communication by respective transfer rates of voice signal 128 kbps, picture signal 384 kbps and data signal 128 kbps is possible.

Figure 12:
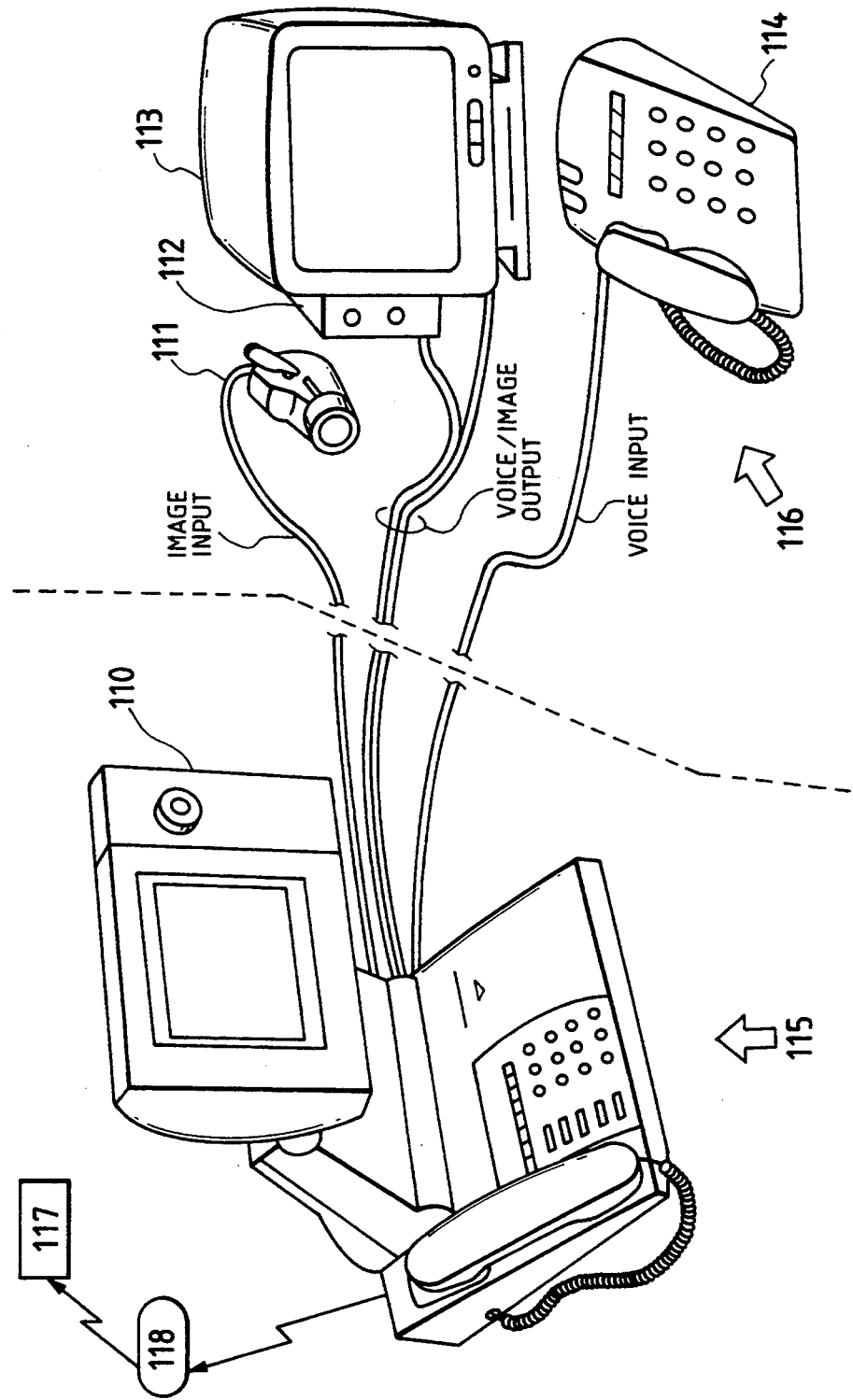
FIG. 12 shows an example of three-partner communication with a combination of an external voice apparatus and an external image apparatus as an embodiment of the invention.

FIG. 12 is a diagram of system constitution as a double television telephone system, where a combination type television telephone of the present invention is used as a parent apparatus with voice and picture input- /output terminals. A television telephone 110 according to the present invention is provided and external units include a camera 111, a speaker 112, a monitor 113, and a telephone 114. Numeral 115 designates a user A, numeral 116 designates a user B, numeral 117 designates a user C, and numeral 118 designates an ISDN network.

For the reception of image/voice signals, a monitor with speaker having a general voice/image input function is used, and the voice and image output terminals of the television telephone are connected by the exclusive cord, and the image and voice signals being received by the user A at the television telephone side can be also confirmed by the user B simultaneously and in parallel by a monitor and a speaker. Also for transmission of image/voice signals, video camera output signals are connected to image input terminals by the exclusive cable, and a microphone or a telephone with voice output terminal is connected with voice input terminals. By switching the external image, voice input system by the user A, voice and image signals of either the user A or the user B are transferred to the communication destination user C through the ISDN network. Thereby the communication among three persons (one to two) can be realized.

Figure 13:
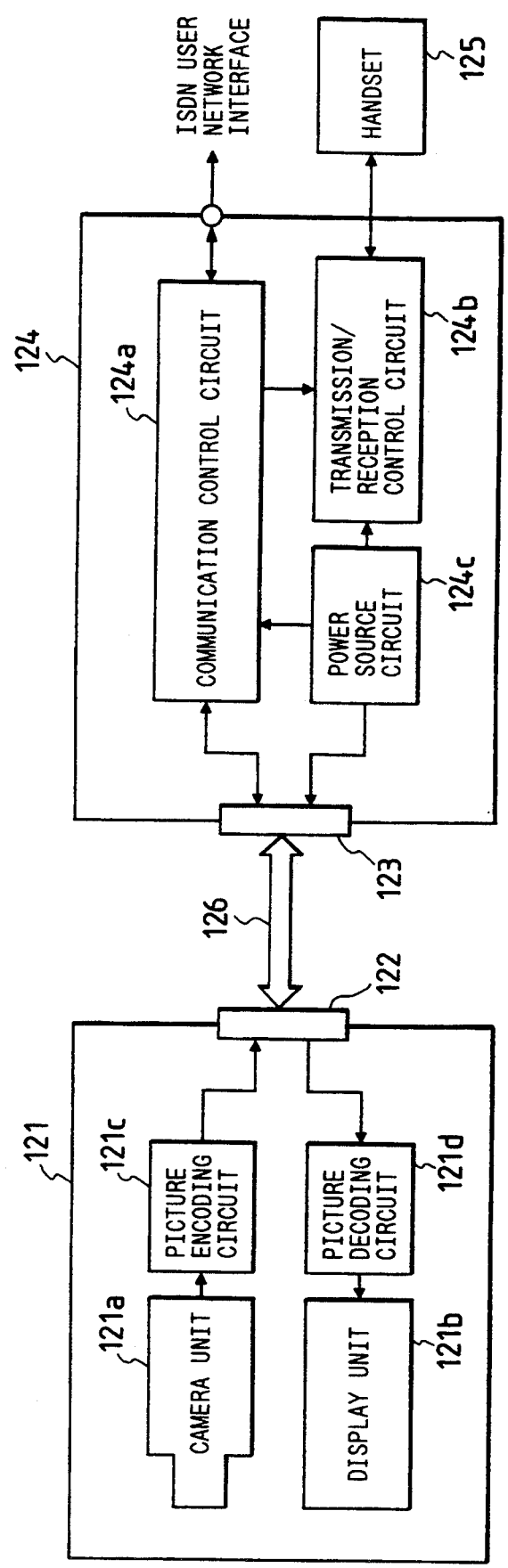
FIG. 13 is a block diagram of a separation type television telephone as an embodiment of the invention.

FIG. 13 is a block construction diagram of a separation type television telephone as an embodiment of the present invention. In this embodiment, the television telephone is separated into a picture apparatus section 121 and a communication control section 124, and respective sections are connected by the exclusive connecting cable 126. In the picture apparatus section, camera image signals are transformed to digital signals by the encoding circuit 121C and connected to the connector part 122, and received picture signals are taken by the same connector 122 and connected to the decoding circuit 121d. Digital signals are transformed to analog image signals in the decoding circuit and outputted to the display section, and the screen indication is carried out on the display unit. The source voltage is supplied from the communication control unit to the picture apparatus section by the same connector, and interfaces between both units are all collected to the same connectors 122 and 123. In the communication control unit, multiplex separation control of picture signals and voice signals is carried out by the communication control circuit 124a, and the ISDN user network interface control is carried out. In the transmission/reception control circuit 124c, transformation between voice digital signals and analog voice signals is carried out and the telephone function by the handset is realized. Also the power supply circuit 124c supplies the source voltage to the communication control unit and through the connector to the picture apparatus section respectively.

Figure 14A:
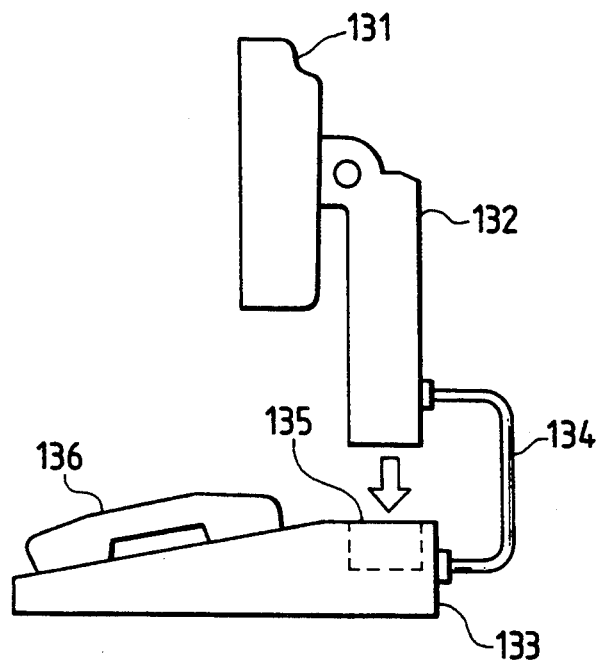
FIGS. 14A and 14B are side views of a separation type television telephone of an embodiment of the invention showing connection arrangements.

FIGS. 14A shows the coupling between the picture apparatus section and the communication control unit. The picture apparatus section is composed of a camera display unit 131 and a picture codec unit 132 attached to a coupling unit 135 of the picture apparatus section having a concave construction and installed on the rear upper surface part of the body 133 which includes the communication control unit. The picture apparatus section and the body 133 are coupled by a connecting cable 134. Thereby a combination type television telephone is formed where picture apparatus units 131, 132 are detachable from the body 133 easily.

Figure 14B:
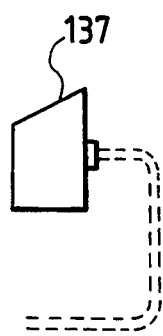

When the picture apparatus section is removed and the apparatus is used as a digital telephone simply, transmission and reception of voice signals only are controlled at the communication control unit, and transmission and reception of picture signals are controlled by a microprocessor in the communication control circuit so that multiplex separation control is not carried out. In this case, a handset is provided. When the apparatus is used as a digital telephone, instead of the picture apparatus section, an indication unit 137 for a digital telephone, as shown in FIG. 14B, is attached to the body 133, and both are connected by the coupling cable and information necessary for telephone function is indicated by characters and figures thereon.

Figure 15A:
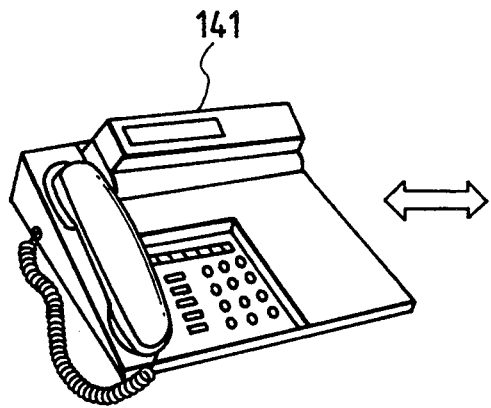
FIGS. 15A and 15B are views of a separation type television telephone of an embodiment of the invention showing connection arrangements.
Figure 15B:
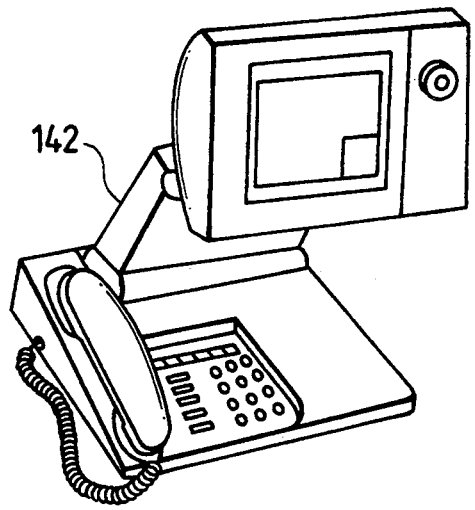

FIGS. 15A and 15B are perspective views of the present invention as a digital telephone 141 and as a television telephone 142, respectively.

Figure 17:
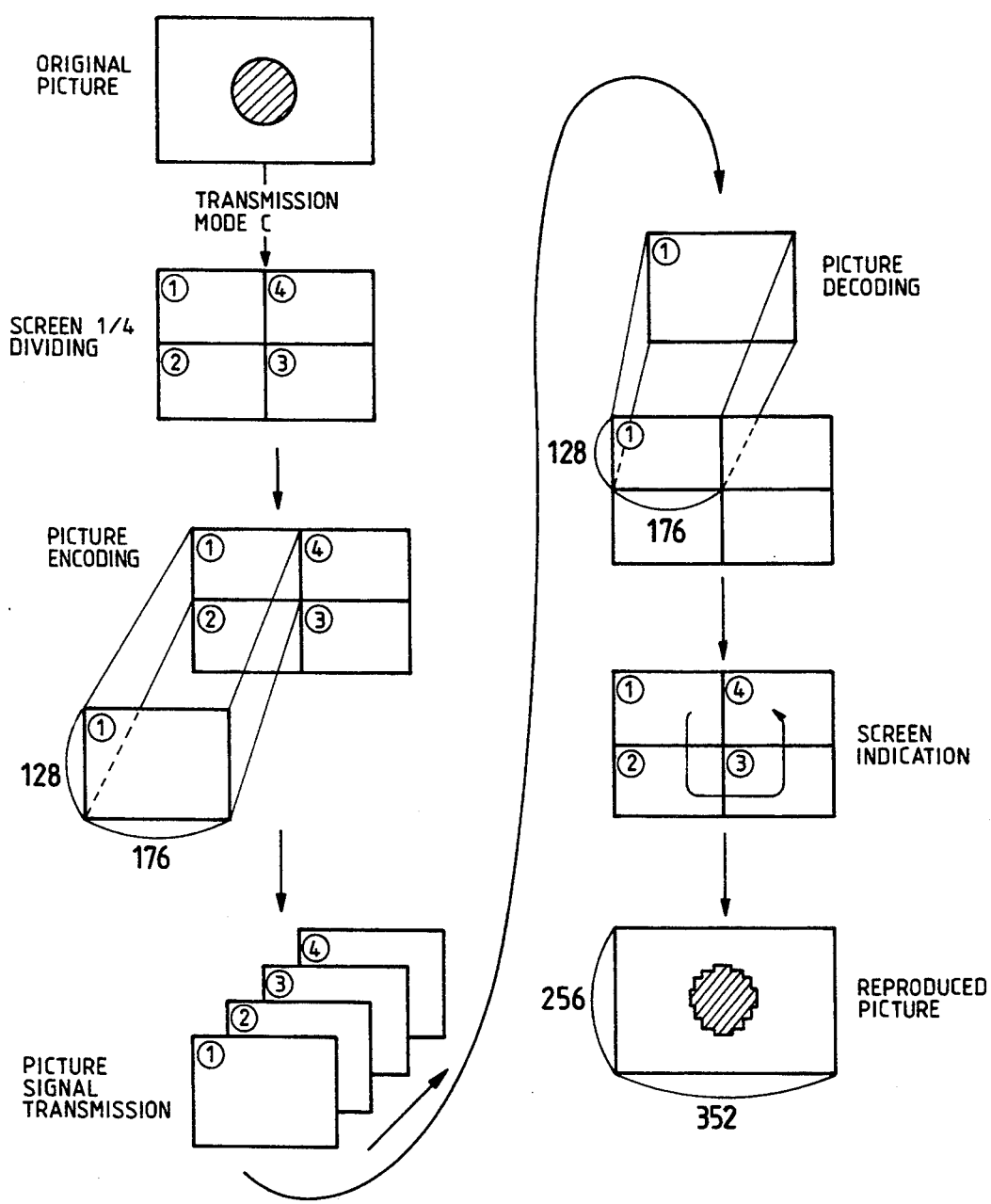
FIG. 17 is a diagram of another still picture transmission system in a picture codec unit of an embodiment of the invention.

FIGS. 16 and 17 are explanation diagrams of three kinds of still picture transmission systems in a picture codec unit of the present invention. Camera images are inputted to a picture encoding circuit of the picture codec unit, and are inputted as picture signals having the number of picture elements 256×352 to a frame memory. 256 is the dot number in the longitudinal direction of the screen, and 352 is the dot number in the lateral direction thereof. In the transmission mode A, picture signals having the number of picture elements 256×352 are encoded, and picture data are transferred and decoded at the receiving side and are reproduced to pictures having the number of picture elements 256×352. The picture element size is (1/256)×(1/352). In the transmission mode B, picture signals having the number of picture elements 256×352 are encoded using the picture element size being four times as large as that of the mode A, i.e., the picture element size of (1/128)×(1/176) as unit, and picture data are transferred and decoded at the receiving side and are reproduced to pictures having the number of picture elements 128×176. According to the still picture transmission systems of both modes, the still picture transmission having convenient usages can be realized corresponding to the two cases, that is, when fine pictures are transmitted with good fidelity and when pictures with less fidelity are transmitted rapidly to the opposite party. As shown in FIG. 7, the transmission mode C, the screen is equally divided longitudinally and laterally into four areas and each of areas ①  to ④  is made a sheet of picture, and as in the transmission mode B, it is sequentially encoded to picture signals having the number of picture elements 128×176 and decoded at the receiving side, and then a sheet of still picture having the number of picture elements 256×352 is reproduced by transmission of continuous picture signals four times from area ①  to area ④ . Thereby fine pictures can be transmitted with fidelity and rapidly and the convenience of usage in the still picture transmission is improved.

Figure 18:
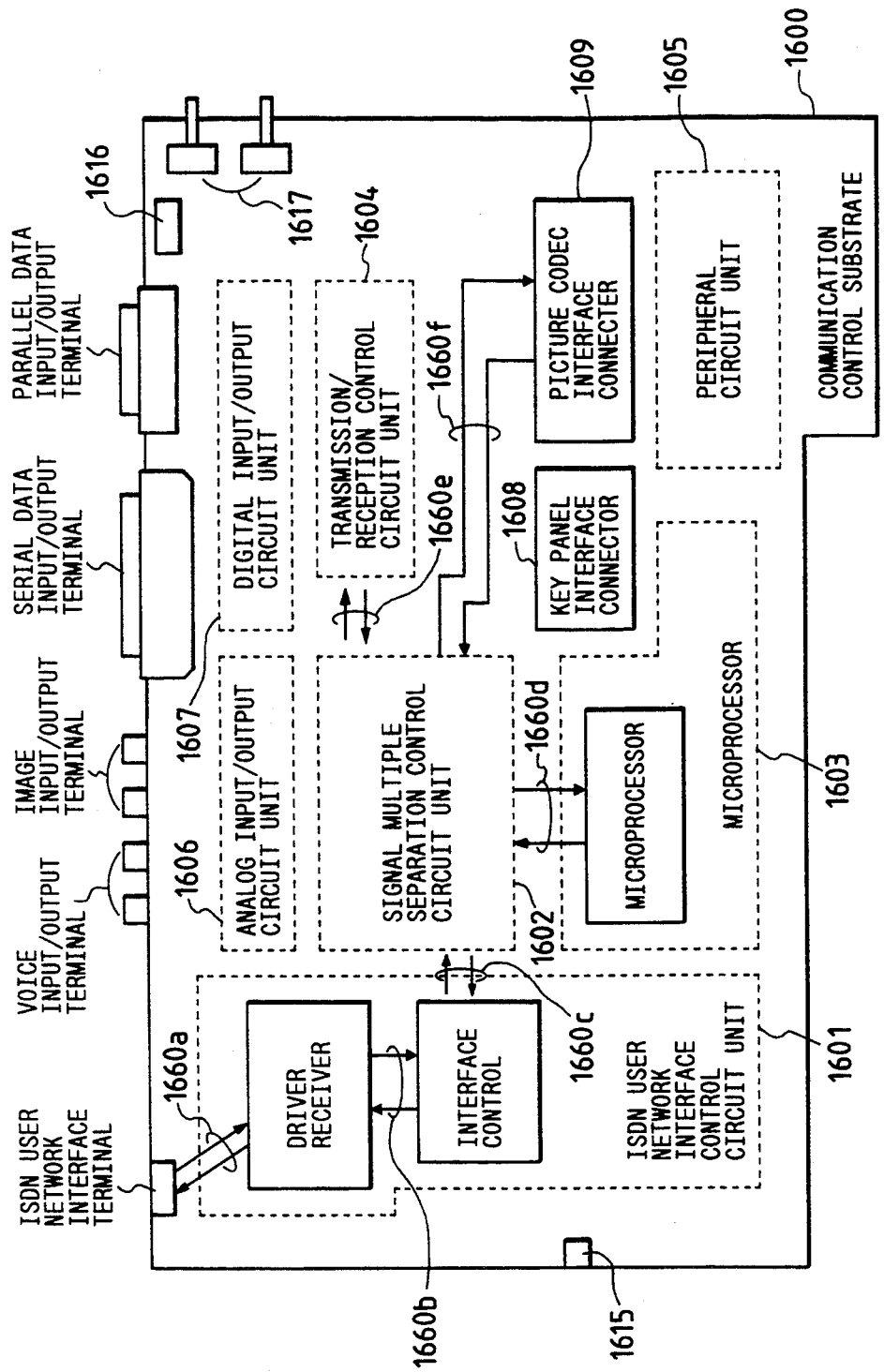
FIG. 18 shows a mounting arrangement of a communication control substrate of an embodiment of the invention.

FIG. 18 is a diagram showing parts mounting arrangement of a communication control substrate of a combination type television telephone of the present invention. The arrangement of a circuit is divided into an ISDN user network interface control circuit unit 1601, a signal multiplex separation control circuit unit 1602, a microprocessor unit 1603, a transmission/reception control circuit unit 1604, analog and digital input/output circuit units 1606, 1607, and a peripheral circuit unit 1605 such as a clock circuit, a battery circuit or the like, and each part is located so that the signal system becomes simple and has shortened length of wiring as shown by the arrow marks in the figure. The signals are represented by 1660a-2B+D transmission/reception signal; 1600b-2B+D transmission/reception signal; 1600c-2B transmission signal; 1660d-control signal; 1660e-voice transmission/reception signal; and 1660f-picture transmission/reception signal. Further, on one side of periphery of the substrate 1600, each input/output terminal of voice, picture, serial and parallel data, and further terminals for ISDN user network interface are mounted, and external input/output terminals are located to be collected together to the back of the television telephone. Switches are located to be collected at the right-upper corner. A switch mounted on the right side of the substrate is the switch 1617 for the adjustment of volume of the sounder and sound tone, and is mounted on the side surface of the television telephone so that users can change the setting. Moreover, the DIP switch 1616 is a switch for ON/OFF operation of the memory back-up circuit, and it is mounted to be located in the interior of the television telephone for it is not used normally. Further, on the substrate 1600, the functions of communication control, man-machine interface control and digital telephone are mounted on a sheet of substrate by the front and back mounting, and are integrated to one body. Moreover, the handset terminal 1615 (modular Jack) is mounted on the left side of the substrate so as to mount the handset on the left side of the apparatus.

Figure 19:
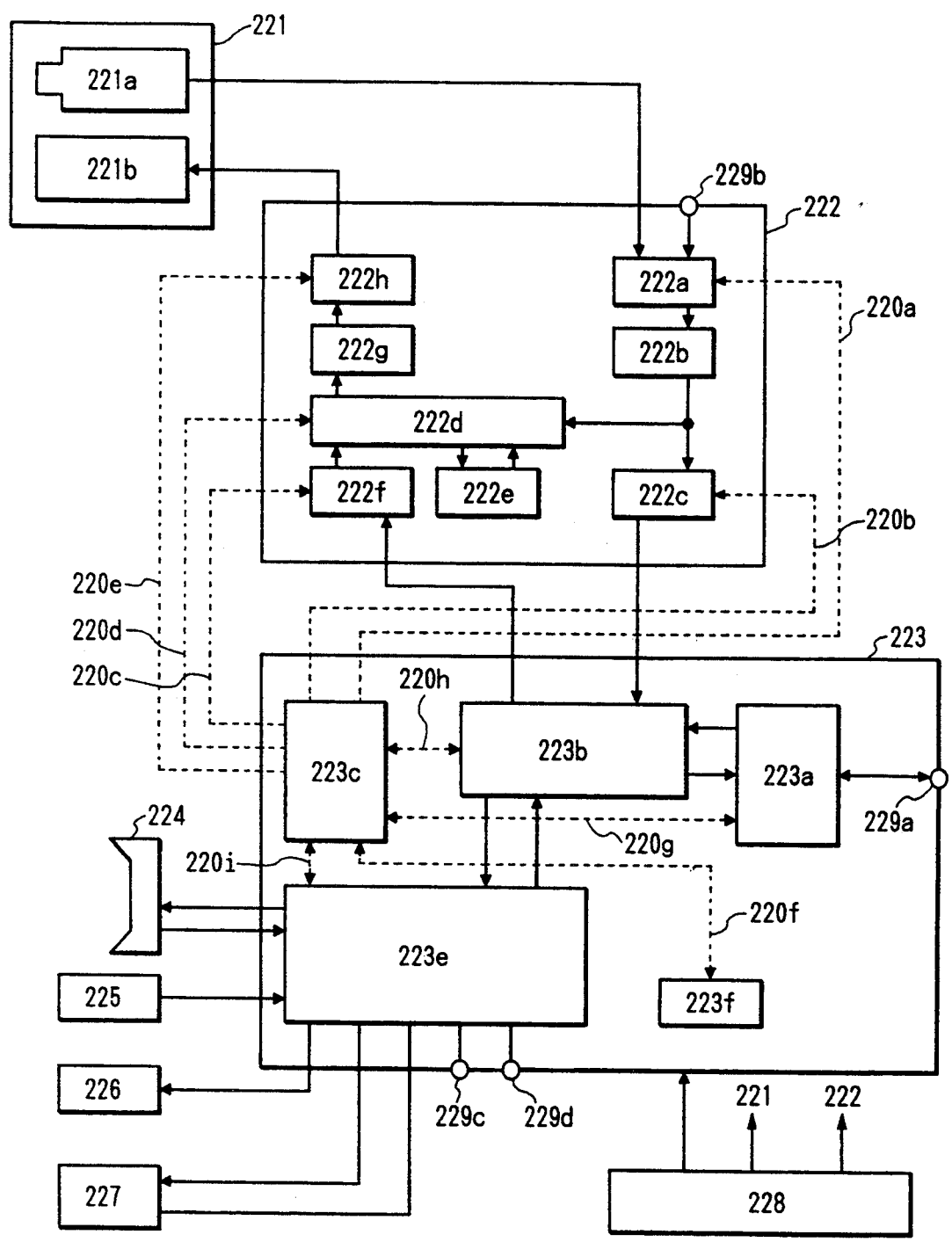
FIG. 19 is a block diagram of another embodiment of the invention.

FIG. 19 illustrates another embodiment of the present invention in block diagram form. As shown, a camera display unit 221 includes a camera unit 221a and a display unit 221b. A picture encoding and decoding unit 222 includes circuits 222a to 222h, wherein a video input switch unit 222a changes image input from the camera unit 221a and external image input 229b by a signal line 220a, and supplies an image output to an analog/digital conversion unit 222b. In the analog/digital conversion unit 222b, image signals are varied to digital signals, and then only an effective area only is taken and outputted to a picture encoding unit 222c and a monitor picture multiplex control unit 222d. In the picture encoding unit 222c, picture information is compressed by the encoding processing, and the picture encoding information is outputted to a signal multiplex distribution circuit unit 223b. A picture decoding unit 222f decodes picture encoding signals distributed from received signals in the signal multiplex distribution circuit 223b, and reproduces digital picture signals. In the monitor picture multiplex control unit 222d, digital picture information outputted by the analog/digital conversion unit 222b is read in one or plural screens to a memory 222e by a control signal 220d, and the information stored in the memory 222e matched with the timing of the decoding digital picture signals outputted by the picture decoding unit 222f is read out in picture elements every one element or every two elements and is overlaid with or replaced by the information of the decoding digital picture signals outputted by the picture decoding unit 222f, thereby the monitor indication indicating a screen or a reduced screen of input signals on the display is realized. Digital picture signals outputted by the monitor picture multiple control unit 222d are inputted to a digital/analog conversion unit 222g and converted into analog image signals and then outputted to a character figure indication superposition unit 222h. The character figure indication superposition unit 222h is constituted by character figure information superposition LSIs and extracts the timing information from the image signals being inputted, and information of commanded characters or figures at the position commanded by a control signal 220e according to the program control of the television telephone control unit 223c is overlaid with or replaced by the image signals, thereby the character figure indication is carried out to the display 221b.

A communication control unit 223 includes circuits 223ato 223f wherein a network interface control unit 223a is connected to a network signal input/output terminal 229a, and according to control of a television telephone control unit 223c and procedure provided by the network, one or plural information transmission channels controlled by the network are connected to a terminal of the opposite party and the communication processing is carried out. A bidirectional control signal 220g transmits control information with the network interface control unit 223a and processing information. A signal multiplexing distributing circuit unit 223b multiplexes the picture encoding information, the voice encoding information and the control information to one or plural channels among the information transmission channels controlled by the network and outputs the information to the network interface control unit 223a, and separates the picture encoding information, the voice encoding information and the control information from one or plural channels among the information transmission channels controlled by the network. The picture encoding information separated by the signal multiplication distributing circuit 223b is outputted to the picture decoding unit 222f and decoded, and the voice encoding information is outputted to a telephone control unit 223e and decoded, and further the control information is outputted to a television telephone control unit 223c and becomes control decision information of the television telephone control unit 223c. The television telephone control unit 223c is constituted by a microprocessor a ROM and a RAM and can execute the processing in multitask by several control programs, and has information processing function of interpreting the inputted information and controlling each component of the television telephone.

The telephone control unit 223e controls the telephone interface of the television telephone, sends and receives voice signals with a handset 224, carries out encoding and decoding processing of voice signals, sends and receives encoding voice signals with the signal multiplexing distributing circuit 223b, supervises a hook switch 225 and detects on-hook and off-hook and informs the television telephone control unit 223c, controls voice outputs to a speaker 226, and controls a key matrix 227 and detects key inputs and informs the television telephone control unit 223c. Also an external voice input 229d and external voice output 229c are changed with voice signal of the handset 224 and controlled according to control from the television telephone unit 223C. A clock circuit unit 223f is constituted by a clock function LSI having timer measuring function and a power source backup battery, and has function of clocking irrespective of ON/OFF of the power source and can read the hour always by control signal 220f. The timer function is subjected to the ON/OFF control from the television telephone control unit 223c, and the television telephone control unit 223c can always read the timer value and be set again by control signal 220f. Further, a power source 228 supplies power to the camera display unit 221, the picture encoding and decoding unit 222 and the communication control unit 223.

Figure 20:
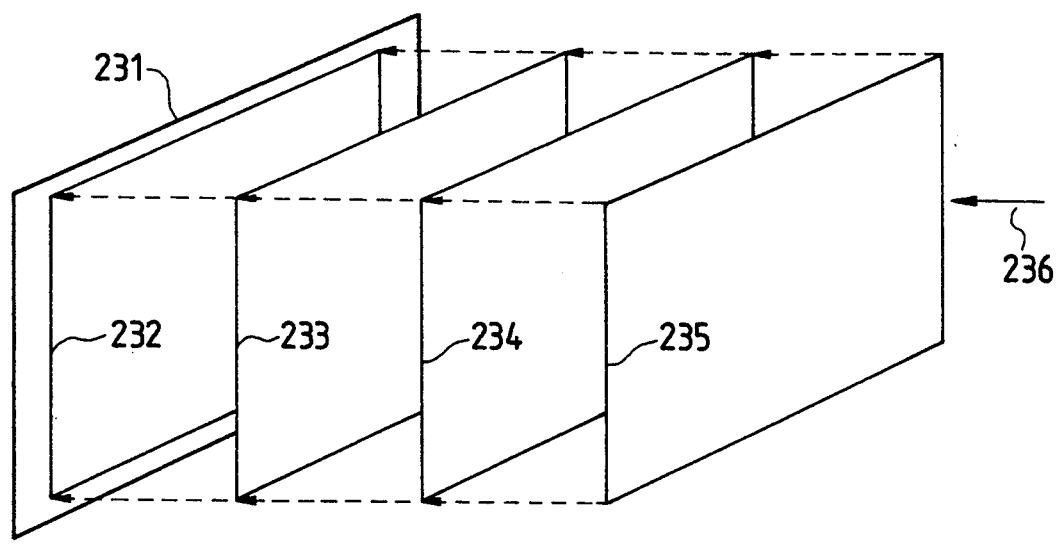
FIG. 20 shows the screen arrangement according to the invention.

Referring to FIG. 20, a screen construction of a color moving picture television telephone of the present invention will be explained wherein a display screen 231 is an area in which the indication is possible by the display, and in this embodiment, an area to be indicated actually is provided within the area. In a decoding image screen 232, moving pictures sent from the opposite party are indicated. In a monitor picture screen 233, a full size screen or a reduced screen of the input image signal screen to be encoded is indicated. In an indication screen 234 for television operation guidance, input confirmation and advice, operation support during operation of a telephone and a television telephone is indicated. In an extended service function indication screen 235, indication for providing extended service function and indication of pictures representing function selection and items corresponding to a part of dial keys are carried out by ion and character display. Numeral 236 designates a position of a visual point. From the screen 232 to the screen 235, since the indication on a nearer position from the visual point is superposed with higher priority, if the character indication is carried out on the screen 234, the character is indicated as if it were overlaid on the screen 232. Consequently, when the monitor picture is indicated on the full area of the screen 233, the screen 232 cannot be seen.

Figure 21:
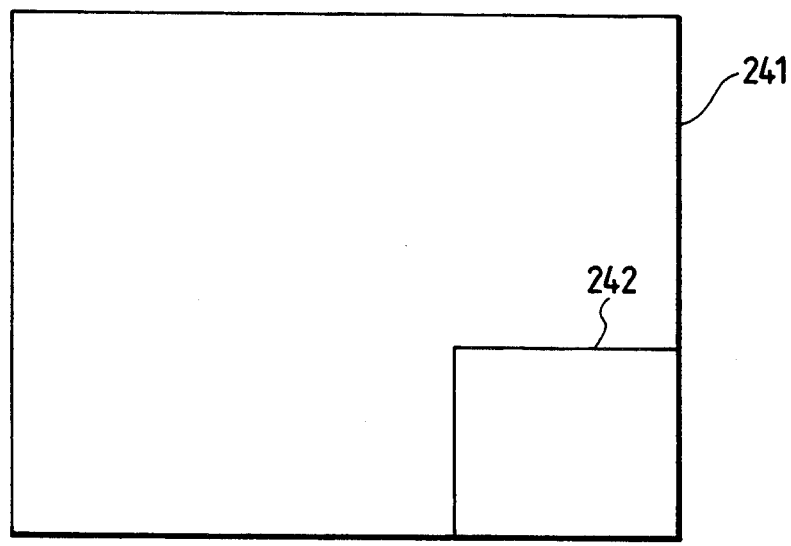
FIG. 21 shows the monitor screen arrangement according to the invention.

FIG. 21 shows construction of a monitor picture screen. The monitor picture screen is constituted by a monitor full screen 241 and a monitor partial screen 242, and a full size screen and a reduced screen of the screen of input image signals being encoded and transmitted are indicated respectively, and the screen registered by the registering function of the extended service function is indicated by input of the monitor key.

Figure 22:
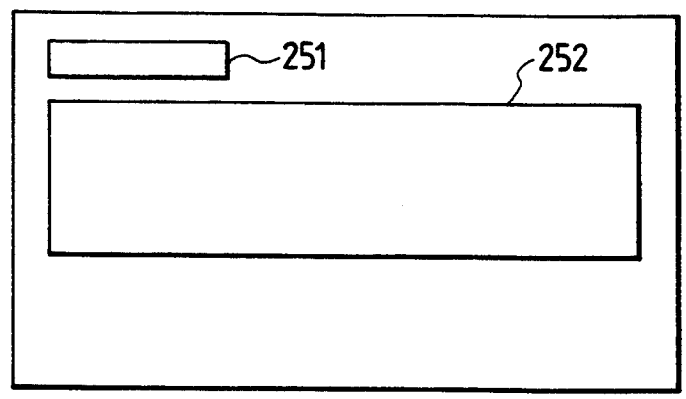
FIG. 22 shows a screen for indication of operation guidance of a television telephone, input confirmation and advice according to the invention.

FIG. 22 shows an indication screen for operation guidance of a television telephone, input confirmation and advice. In an hour/communication time indication screen 251, the present hour is indicated in HH:MM form during non communication, and the communication time is in form of MM min SS sec during the communication. A screen 52 indicates operation guidance of a television telephone, input confirmation and advice.

Figure 23A:
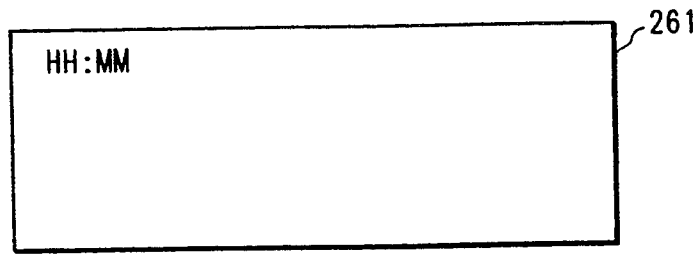
FIGS. 23A-23F show examples of screens for indication of operation guidance of a television telephone, input confirmation and advice according to the invention.
Figure 23B:
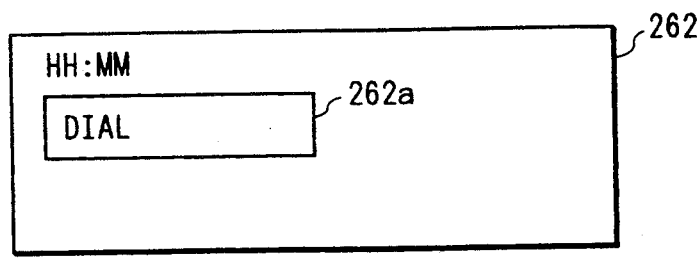
Figure 23C:
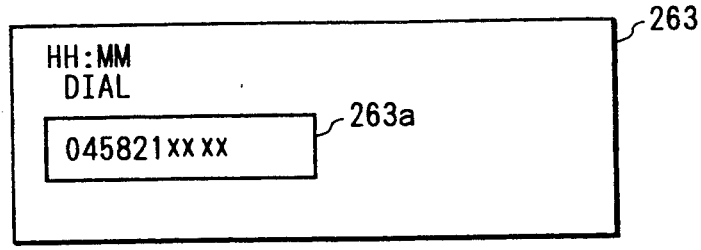
Figure 23D:
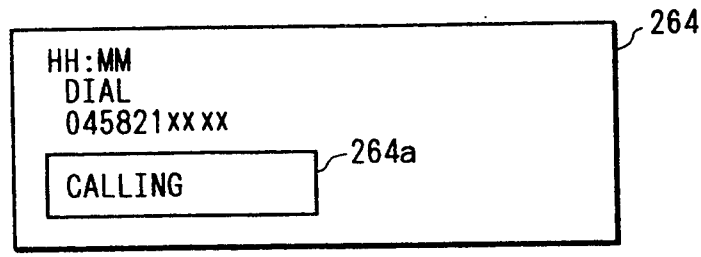
Figure 23E:
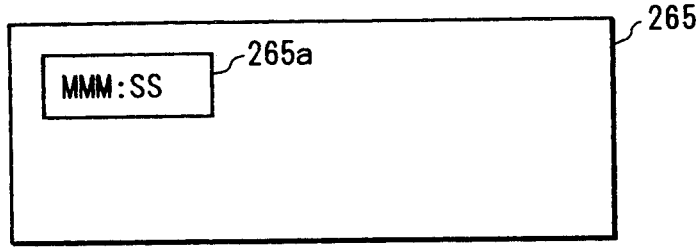
Figure 23F:
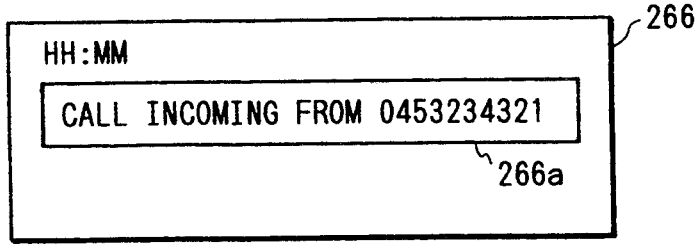

FIGS. 23A-23F show indication examples of screens for indication of operation guidance of a television telephone, input confirmation and advice. In a normal screen 261, the hour indication only is carried out when the extended service function is not started during no communication (FIG. 23A). Numeral 262 designates a call originating screen in which a dial input promotion guidance 262a is indicated if the off-hook operation of elevating the handset is carried out at the normal screen state 261 (FIG. 23B). Numeral 263 designates a call originating screen in which a dial input confirmation indication 263a is indicated if the dial input is carried out at the call originating screen (FIG. 23C). At a lapse of 4 seconds after the dial input, decision of the dial input end is effected and the call originating is requested to the network. When the request of call originating is recognized in the network and advice of the opposite party being called is received, the screen becomes a calling screen 264 and a calling advice screen 264a is indicated (FIG. 23D). If the opposite party responds to the calling, the screen becomes a communication screen 265 and a communication time indication 265a only is indicated (FIG. 23E). Also if the call incoming is detected in the normal screen 261, the screen becomes a call incoming screen and a call incoming advice indication 266a is carried out (FIG. 23F).

Figure 24:
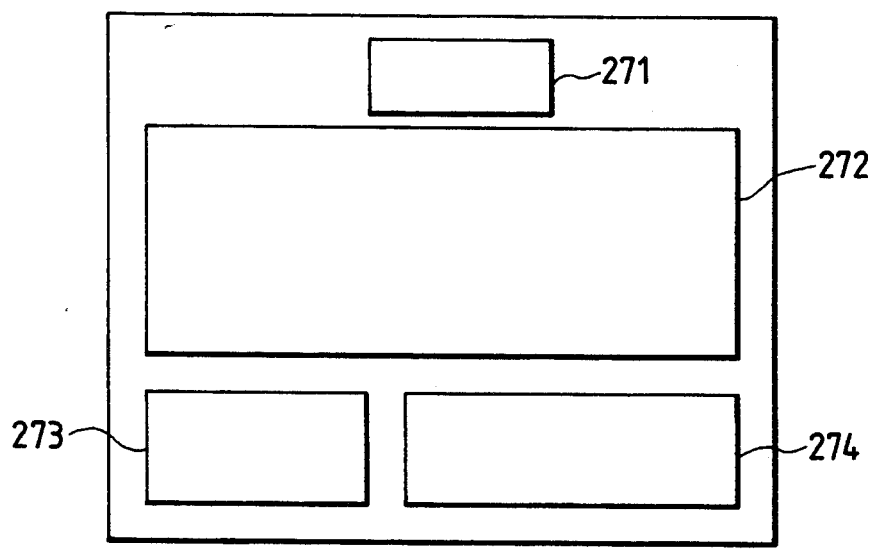
FIG. 24 shows the screen arrangement for indication of extended service according to the invention.

FIG. 24 shows construction of an extended service indication screen. In an extended service function states indication area 271, stratum of the extended service function formed in stratums is indicated by pictures or figures selected at the forward stratum by one. An extended service indication area 272 indicates extended service function operation guidance and functions and items to be selected. A key correspondence picture indication area 273 indicates pictures representing functions and items to be selected when the corresponding dial key is inputted. An extended service advice indication area 274 is used as an indication screen in the case of necessitating the advice indication, for example, when the extended service is started and the call incoming is detected.

Figure 25A:
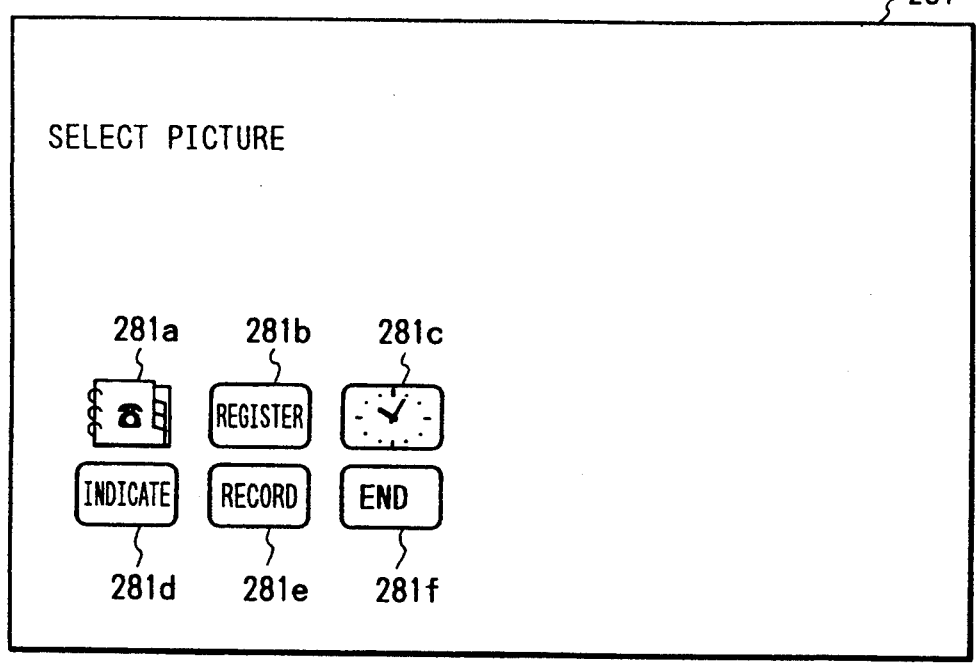
FIGS. 25A-25D show examples of screens for indication of extended service according to the invention.

FIGS. 25A-25D shows examples of extended service screens. In FIG. 25A, numeral 281 designates an extended service function start screen in which if the extended service start key is inputted at the start enabling state, it is detected in the telephone control unit 223e and informed to the television telephone control unit 223c and interpreted and the extended service function processing is started as one of plural processings of the television telephone control unit 223c and the screen 281 representing the function with the highest stratum is indicated. Numeral 281a designates a telephone directory function picture and this position corresponds to "1" of the dial key, and if the dial "1" is inputted, the telephone directory function processing is started. Numeral 281b designates a register function picture and this position corresponds to "2" of the dial key, and if the dial "2" is inputted, the register function processing is started. Numeral 281c designates an hour register function picture and this position corresponds to "3" of the dial key, and if the dial "3" is inputted, the hour register function processing is started. Numeral 281d designates an indication ON/OFF function picture and this position corresponds to "4" of the dial key, and if the dial "4" is inputted, setting processing is started as to whether the indication in the screen is effective or not. Numeral 281e designates a record indication function picture corresponding to "5" of the dial key, and if the dial "5" is inputted, the communication record indication processing is started. Numeral 281f designates a function end picture, which means stop the extended service function in the screen 281, and in function of other stratum, it means the end of the stratum and reset of function at a forward stratum by one.

Figure 25B:
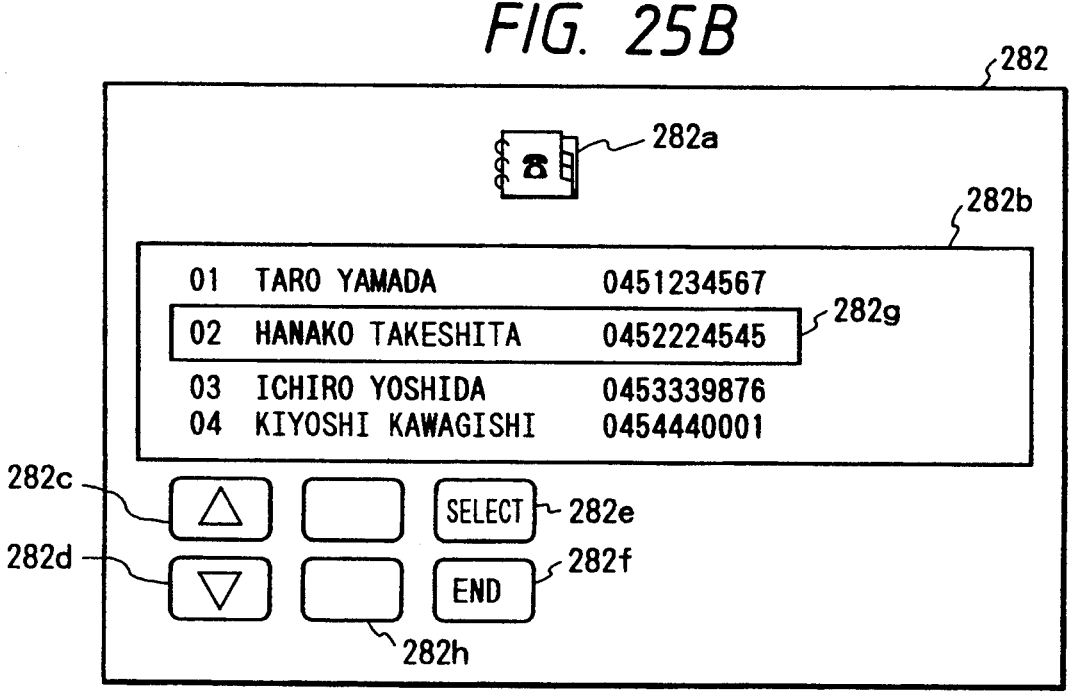
Figure 25C:
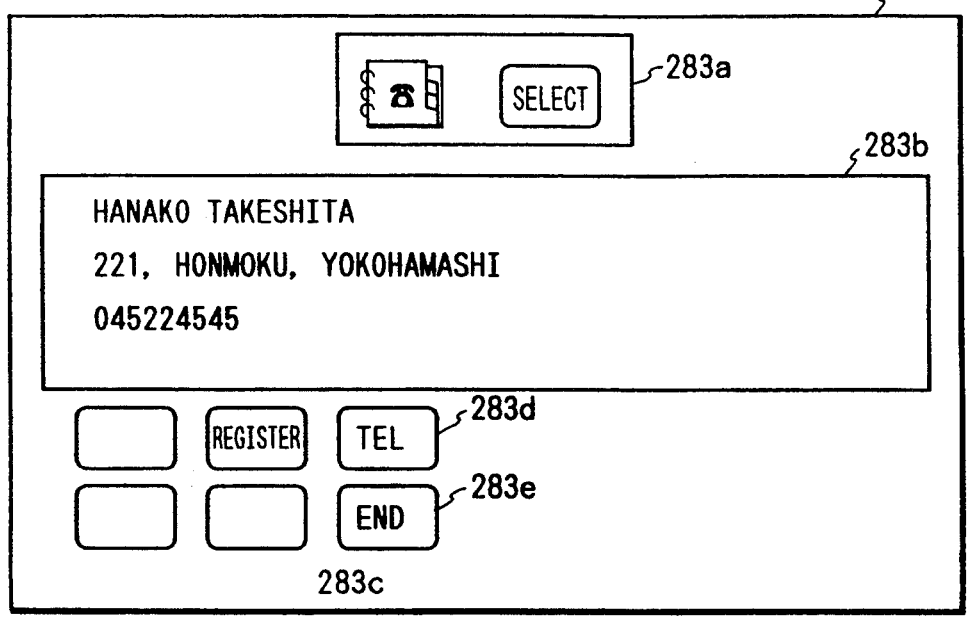

In FIG. 25B, numeral 282 designates a telephone directory function screen in which if the dial "1" is inputted in the extended service function start screen 281, the telephone directory function processing is started and the telephone directory start screen is outputted on the screen. In the telephone directory function screen 282, a telephone directory function stratum indication 282a, a telephone directory item screen 282b representing contents registered in the telephone directory, a cursor up picture 282c as a telephone directory function selection picture corresponding to the dial key "1", a cursor down picture 282d corresponding to the dial key "4" an item selection picture 282e corresponding to the dial key "3", a telephone directory function end picture 282f corresponding to the dial key "6" and a cursor 282g are indicated Numeral 282h designates an ineffective picture which may be neglected since there is no function corresponding to the key input. The cursor 282g is moved up and down by input of the dial keys "1" and "4" and if the dial key "1" is inputted with the cursor being at the highest line of 282b, the whole item is rolled up and next item is indicated. Also if the dial key "4" is inputted with the cursor 282g being at the lowest line of 282b, the item is rolled down and next item is indicated. In the screen 282, if the cursor 282g is moved by the dial keys "1" and "4" and the item is selected by 282e, the telephone directory register content indication processing is started and a telephone directory register content indication screen 283 is indicated as shown in FIG. 25C.

In the screen 283, a telephone directory function stratum indication 283a, a register content detail indication 283b, a register function picture 283C corresponding to the dial key "2", a dial function picture 283d corresponding to the dial key "3", and a telephone directory detail indication end picture 283e are indicated. In the screen 283, if the dial key "3" is inputted and the dialing function is selected, the call originating processing is started and the call originating operation by the telephone number being registered is started. The extended service function is finished in order not to prevent the call originating processing.

Figure 25D:
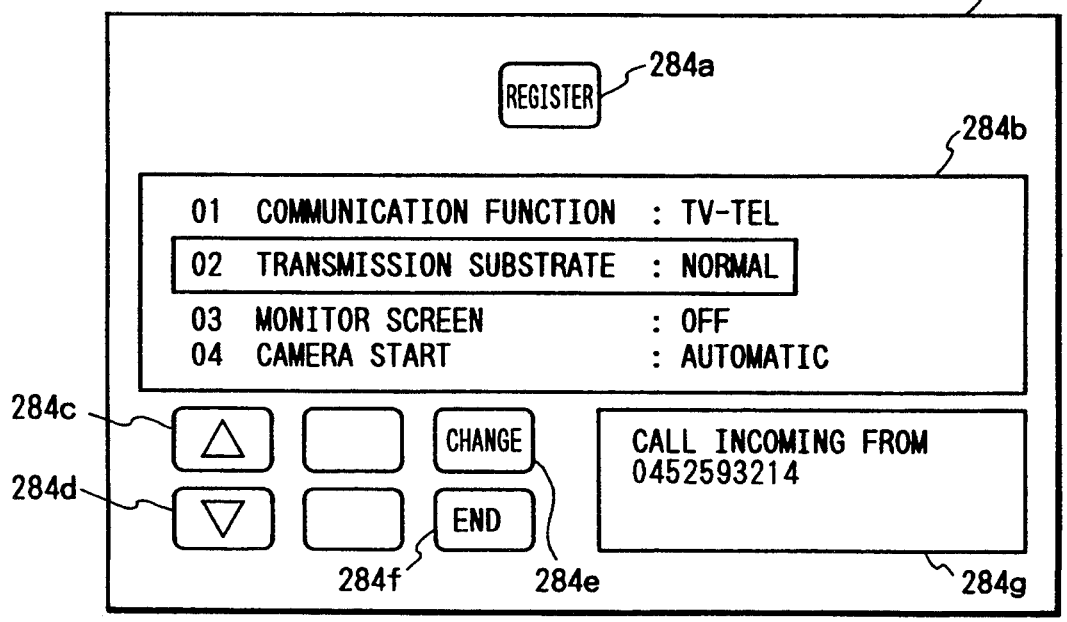

If the dial key "2" is inputted in the screen 281 and the register function is selected, the television telephone register processing is started and a television telephone register screen 284 is indicated as shown in FIG. 25D. In the screen 284, a television telephone register function stratum indication 284a, a register item indication 284b, a cursor up picture 284c as a television telephone register function selection picture corresponding to the dial key "1", a cursor down picture 284d corresponding to the dial key "4", a register content change picture 284e corresponding to the dial key "3", a television telephone function end picture 284f corresponding to the dial key "6", and a cursor 284g are indicated. The pictures 284c and 284d act similarly to the pictures 282c and 282d. If the dial key "3" is inputted and the register content change processing is started, next proposed item succeeding the registered item is registered and indicated on the screen. Indication of the register contents is carried out cyclically by the number of proposed items. If the call incoming is received at the screen 284, a call incoming advice 284g is indicated on the extended function advice indication area.

Figure 26:
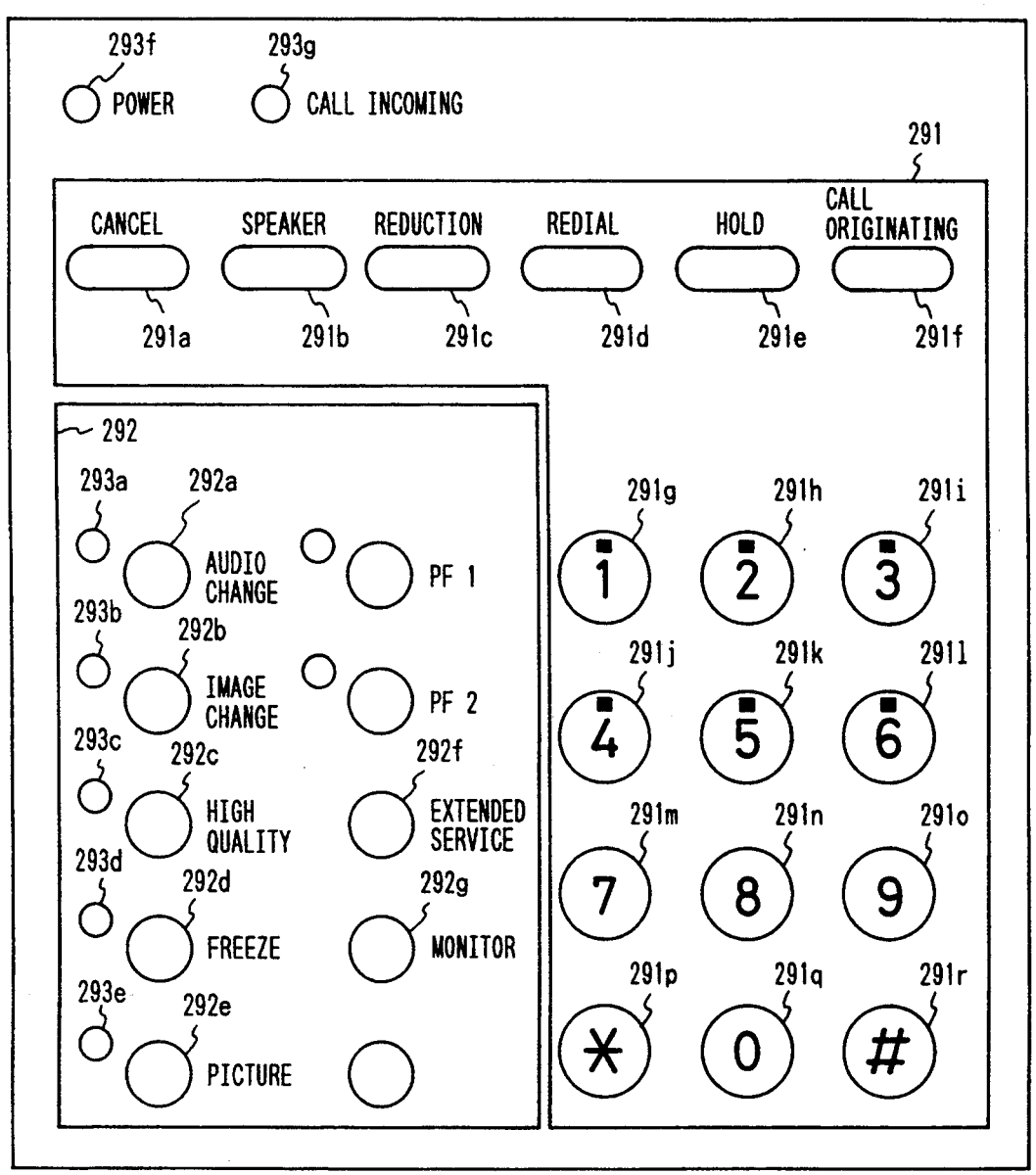
FIG. 26 shows a television telephone key input unit according to the invention.

FIG. 26 shows the arrangement of a television telephone key input unit. The television telephone key input unit is constituted by keys installed at a conventional telephone with extended function, such as a cancel key 291a, a speaker key 291b, a reduction key 291c, a redial key 291d, a hold key 291e, a call originating key 291f and dial keys 291g to 291r, and additive keys required in a television telephone, such as a voice change key 292a requesting changing of voice inputs, a voice input indication LED 293a, a picture change key 292b requesting changing of picture inputs, a picture input indication LED 293b, a high picture quality key 292c changing encoding mode of inputted picture signals, an encoding mode indication LED 293c, a freeze key 292d requesting fixing of transmitted pictures, an LED 293d indicating the fixed state of transmitted picture, a picture key 292e requesting transmission of pictures, a picture mode indication LED 293e, an extended service start key 292f starting extended service function and a monitor key 292g requesting indication of the monitor screen, and a power source indication LED 293f and a call incoming indication LED 293g. Keys corresponding to the key correspondence picture indication area are the dial keys 291g to 291l.

Figure 27:
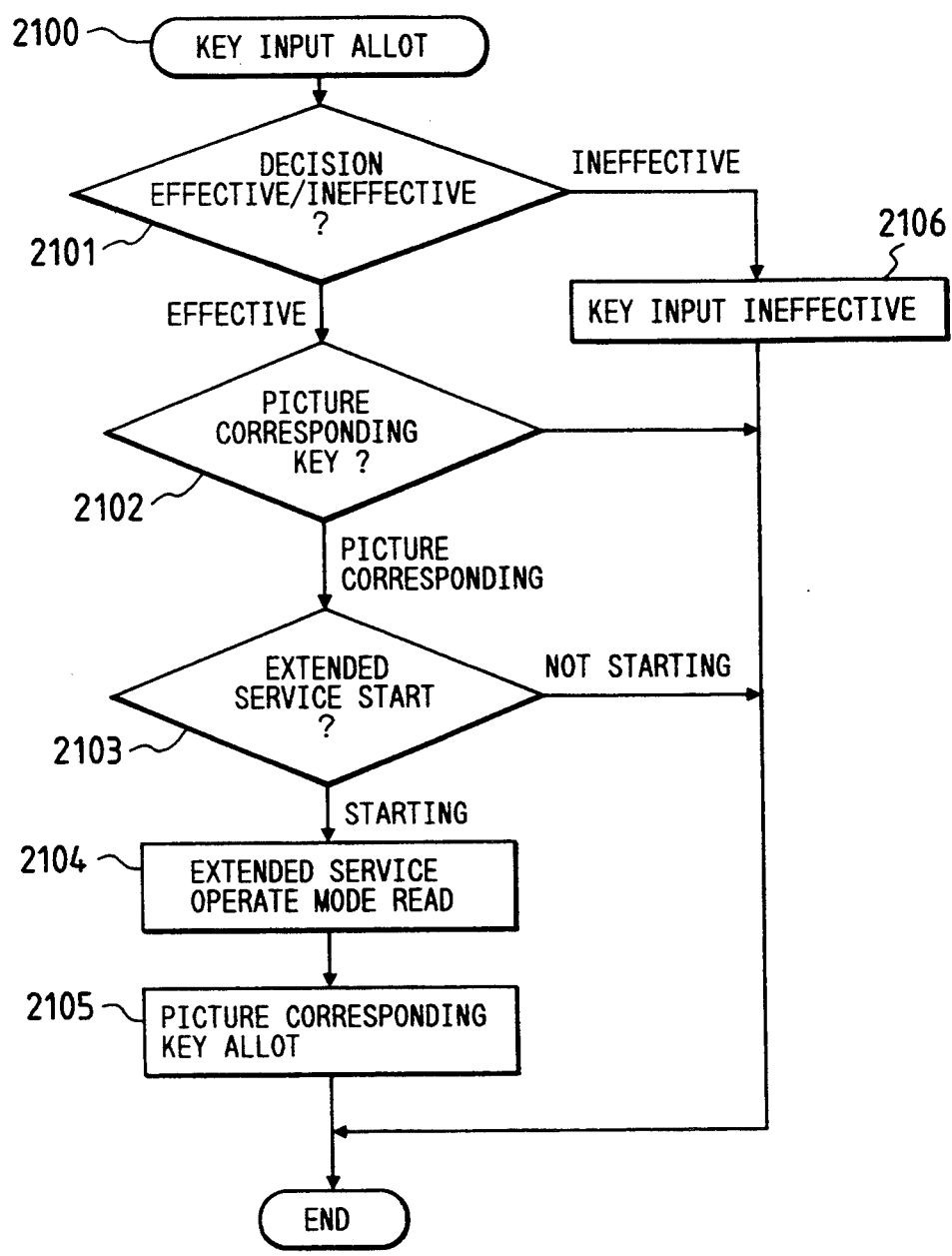
FIG. 27 is a flowchart showing key input allotting processing according to the invention.

FIG. 27 shows key input allotting processing executed in the television telephone control unit 223c. If the key input is detected in the telephone control unit 223e, it is informed to the television control unit 223c and the key input allotting processing is started. In the key input allotting processing, the key information being informed is read, and the key input effectiveness decision processing (2101) is carried out and it is checked whether the key information is effective or not. When the key information is effective, the picture correspondence key decision processing (2106) caries out decision as to whether the key information corresponds to pictures or not. When the key information corresponds to pictures, according to the extended service start state and the extended service operation mode, the extended service function input information is allotted to the key information. (2103, 2104, 2105, 2106)

FIG. 28 shows key input processing to execute processing corresponding to the allotted key information. The key information is subjected to the processing required by respective information in the input decision processing (2111). When the key information is the extended service start key, the extended service function start key processing (2112) is executed, and according to the extended service function start state and the operation state of the television telephone, starting or stopping of the extended service function or neglecting of the input information is executed. (2112a, 2112b, 2112c, 2112d). When the key information is the television telephone register key information of the extended service function allotted by the picture correspondence key allotting processing (2105), the start state of the extended service function is checked and the television telephone register processing is started (2113). At the time of starting the call originating processing 2114 and the call incoming processing 2115, the start state of the extended service function is checked. If the extended service function is started, the extended service stopping processing is carried out compulsorily thereby the indication area is utilized in the time dividing.

FIG. 29 shows the start, stop and processing execution limitation conditions of the executed service function according to the operation state of the television telephone. As shown in FIG. 29, when the television telephone is in the call connection processing and in the call disconnect processing, since start of the extended service function and continuation of the processing are also limited, the indication of operation guidance, input confirmation and advice being generated in the operation of the television telephone and the indication of extended service function can be prevented from being overlaid then.

Figure 30:
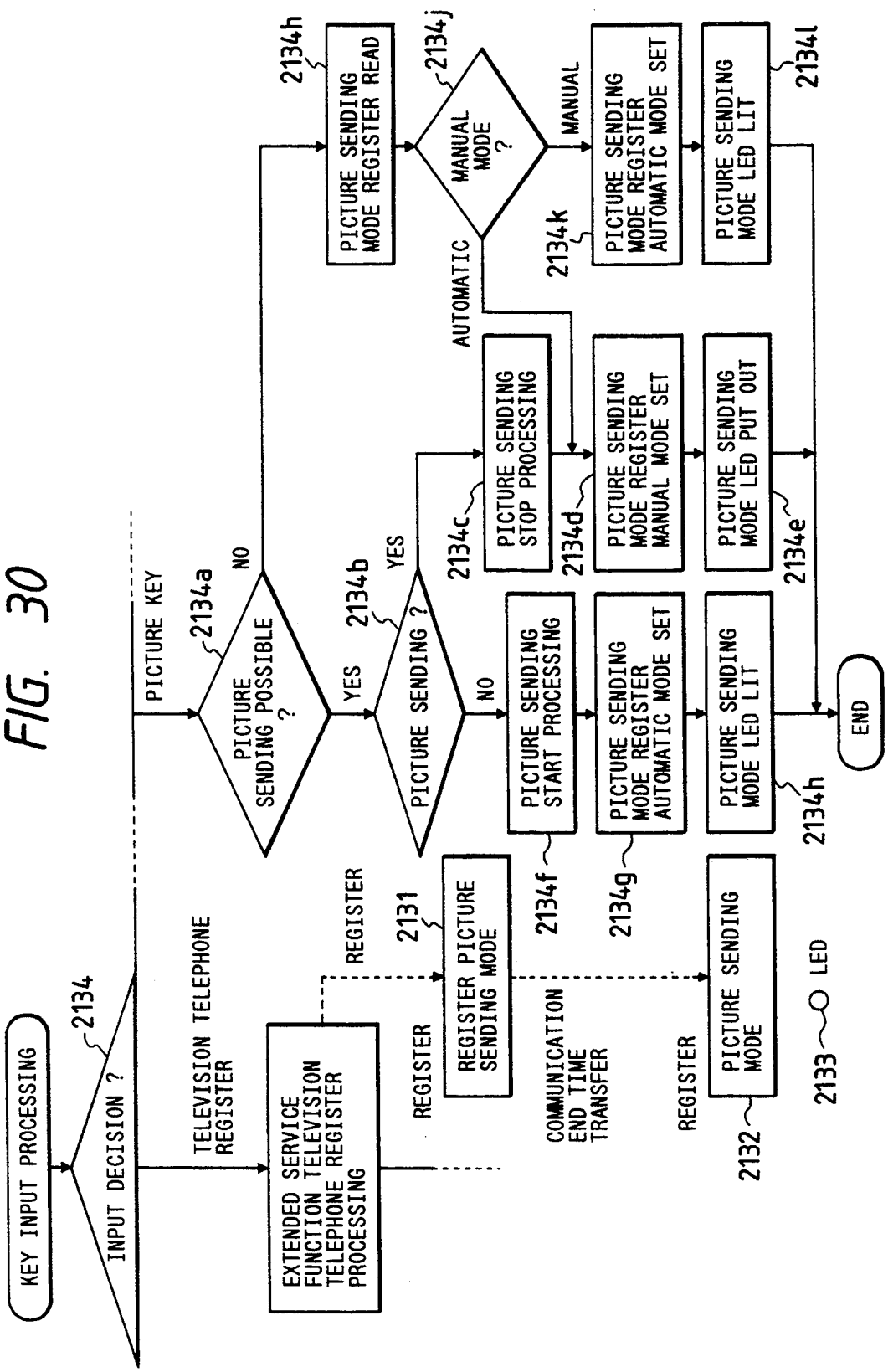
FIG. 30 is a flowchart showing processing corresponding to a picture key according to the invention.

FIG. 30 shows processing corresponding to a picture key. Registration as to whether the sending mode of pictures is automatic or manual and changing in every transmission and request of the manual sending of pictures at the time of manual picture sending mode are realized. Numeral 2131 designates a register picture sending mode register which registers the picture sending mode at the time of starting the normal communication in the television telephone register function of the extended service function. Numeral 2132 designates a picture sending mode register which can be actually used for decision of the picture sending. In the register 2132, the setting contents of the register 2131 are set again by the call disconnect processing at the communication end. A picture sending mode indication LED 2133 indicates contents Of the register 2132. Numeral 2134 designates picture key input processing executed after the input decision in the key input processing, and if the picture key is inputted, the television telephone is in communication with a terminal which can receive pictures, and decision is effected by 2134a as to whether the present communication mode is in the state to enable the picture sending or not. In the state to enable the picture sending, decision is effected by 2134b as to whether the pictures are being transmitted or not. If the pictures are being transmitted, picture sending stop processing 2134c is executed, and the picture sending mode register 2132 is set to manual operation and the picture sending mode indication LED 2133 is put out (2134d, 2134e). If the pictures are not being transmitted, picture sending processing 2134f is executed and the picture sending mode indication LRD 2133 is lit. (2134f, 2134g, 2134h).

In the state to disable the picture sending, the picture sending mode register 2132 is read, and at the automatic mode; the manual mode is set to the picture sending mode register 2132 and the picture sending mode indication LED 2133 is put out. At the manual mode, the automatic mode is set to the picture sending mode register 2132 and the picture sending mode indication LED 2133 is lit. (2134d, 2134e, 2134g, 2134i, 2134j, 2134k, 2134l). In the television telephone communication mode establishing processing, when the transition to the state to enable the picture sending is detected, the picture sending mode register 2132 is read, and at the automatic mode, the picture sending processing is executed.

Figure 31:
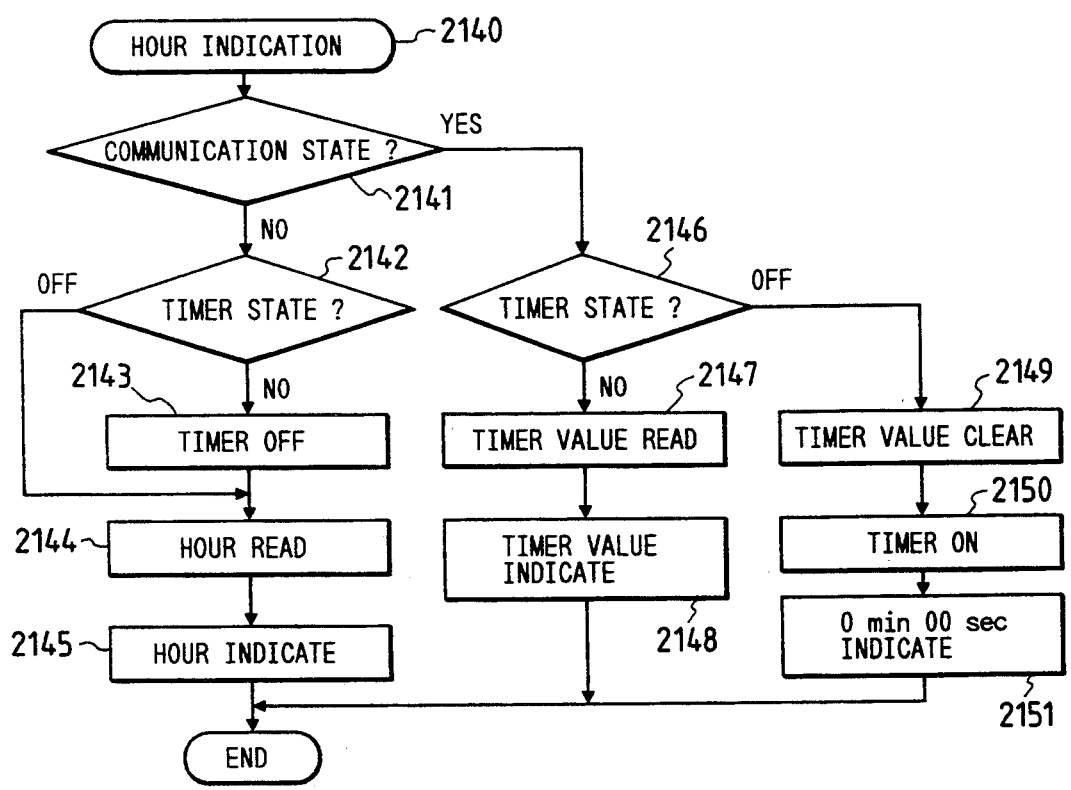
FIG. 31 is a flowchart showing hour/communication time indication processing according to the invention.

FIG. 31 shows hour/communication time indication processing. The hour/communication time processing is executed every 100 ms by the timer interrupt of the system, and the hour and the timer value are read from the timer circuit 23f, and the hour or the communication time (timer value) is indicated at the right-upper side of the screen. In the hour/communication time indication processing, decision of the communication state is effected by the communication state decision 2141. During no communication, the hour is read from the timer circuit and the indication is carried out in HH:MM form. Then the timer state is checked, and if the timer is at the ON state, it is turned off. (2141–2145) During the communication, if the timer is at ON state, the timer value is read from the timer circuit 223f and indicated in form of MM min SS sec. (146, 147, 148) If the timer is at the OFF state, the timer value of the timer circuit 23f is cleared, and the restarting of the timer is set and 0 min 00 sec is indicated.

As above described, the registration as to whether the sending mode of pictures is automatic or manual and changing of the sending mode in every transmission and request processing of the manual sending of pictures at the manual picture sending mode can be realized.

The present invention as described, provides the following effects including that the picture apparatus section comprises a camera display unit installed on the top side of the apparatus and coupled through a support section (longitudinal side of L-shape) having a picture codec unit coupled to communication control unit installed on a bottom section (base section) forming the body and including a power supply unit integrated therewith. Concerning the wirings in the apparatus, for example, one multi-core (50 cores) cable between the picture codec unit and a communication control unit, one multi-core (25 cores) between the communication control unit and a key panel unit, one multi-core (four cores) cable between the camera display unit and the picture codec unit, and cable wirings from the power source to the communication control unit, the picture codec unit, the camera unit, the display unit are carried out such that space-saving wiring is realized. Further, hindrance against the air flow in the inside space of the apparatus is reduced, and the air cooling effect is raised, and separation at the time of system fault becomes easy since it is of small size and is easily portable. Moreover, since the cables to be connected to the outside from the body on account of a combination type may be only two cables, that is, a cord for communication lines and a cord for power supply, the terminal apparatus is easily laid out on a desk and high convenience of usage is obtained.

Additionally, according to the present invention, the manipulatability of the color moving picture television telephone terminal and the function extendibility cane be significantly improved, and the man-machine interface similar to that of a conventional telephone can be provided. Also, the extended service function is made in stratums so that the safety can be improved. Many keys or setting switches can be omitted and are easily extended whereby the economic property can be improved. Further, a picture key having new functions is provided, whereby the intention of the user to send pictures can be reflected accurately and privacy can be protected.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A television telephone comprising:
   a movable head section including image input means for inputting images and display means for displaying images;
   a bottom section including communication control means for transmission and reception of encoded information of at least one of audio and visual signals to and from a communication network, and telephone control means for controlling transmission and reception functions and including a key console unit; and
   a support section for connecting the bottom section and the movable head section and for supporting the movable head section, the support section including image encoder/decoder means for encoding image input signals and for decoding received image signals.

2. A television telephone according to claim 1, wherein the movable head section, the bottom section and the support section form an integrated construction.

3. A television telephone according to claim 1, wherein the support section extends transversely to the bottom section so that the television telephone has an L-shaped configuration.

4. A television telephone according to claim 1, wherein the support section and movable head section are arranged for removable coupling to the bottom section so that the bottom section, when the support section and movable head section are not coupled thereto, operates solely as a digital telephone.

5. A television telephone according to claim 1, wherein the communication control means of the bottom section includes means for multiplexing of audio signals, visual signals and data signals for transmission to the communication network and means for demultiplexing multiplex received encoded information from the communication network.

6. A television telephone according to claim 1, wherein the support section is provided with ventilation openings enabling natural circulation cooling of the image encoder/decoder means.

7. A television telephone according to claim 1, wherein the movable head section is connected with the support section for enabling movement with respect thereto.

8. A television telephone according to claim 7, wherein the support section is connectable with the bottom section and arranged for movement with respect thereto.

9. A television telephone according to claim 1, wherein the image input means of the movable head section includes a camera unit for inputting moving picture images and still picture images including document and photographic images.

10. A television telephone according to claim 9, wherein the camera unit includes means for positioning the camera unit so as to look downwardly independently of the position of the display means, the camera unit in the looking downward position enabling inputting information of documents.

11. A television telephone according to claim 10, further comprising means responsive to the looking downward position of the camera unit for automatically transforming the image inputted by the camera unit in point symmetry rotated by 180° and for enabling transmission of the transformed image signal for display.

12. A television telephone according to claim 10, wherein the bottom section includes an upper surface for supporting documents thereon, the camera unit in the looking downward position thereof enabling inputting information of the documents supported on the bottom section.

13. A television telephone according to claim 1, wherein the display means includes means for enabling at least one of monitor display of image input signals and display of received image signals.

14. A television telephone according to claim 13, wherein the display means provides color moving picture display.

15. A television telephone according to claim 13, wherein the display means includes a liquid crystal display.

16. A television telephone according to claim 13, wherein the display means includes simultaneous display of image input signals at one portion of a screen thereof and received image signals at another portion thereof as a picture-in-picture display.

17. A television telephone according to claim 16, wherein the key console unit includes a plurality of keys, at least one of the keys enabling display.

18. A television telephone according to claim 13, further comprising means for providing at least one of indication of guidance information of television telephone operation, advice information and input confirmation indication for display on the display means.

19. A television telephone according to claim 18, wherein the indication includes icon and characteristic indication.

20. A television telephone according to claim 18, wherein the display means enable superposition of at least one of the guidance information, advice information and input confirmation information in superposition on the image signal for display.

21. A television telephone according to claim 1, wherein the movable head section, bottom section, and support section are separate units connectable to one another, the movable head section being movable with respect to the support section.

22. A television telephone according to claim 21, wherein the image encoder/decoder means includes a picture codec unit.

23. A television telephone comprising:
communication control means for transmitting and receiving digital encoded information of at least one of audio signals, visual signals and data signals to and from a communication network including means for multiplexing the transmitted digital encoded information and demultiplexing the received digital encoded information;
internal audio and visual input/output means including visual input means for inputting images, display means for displaying images, and telephone control means for controlling transmission/reception functions thereof;
external input/output terminal connection control means for enabling operation in cooperation with external equipment including at least one of audio, visual and data equipment, the external input/output terminal connection control means being mounted on a rear surface of a bottom section of the television telephone; and
key operation selecting control means for controlling connection with the communication control means and for effecting selective switching between the internal audio and visual input/output means and the external input/output terminal connection control means;
wherein the external input/output terminal connection control means includes a plurality of terminal connections which are integrated on the rear surface of the bottom section of the television telephone.

24. A television telephone according to claim 23, wherein the key operation selecting control means includes a key console unit having a plurality of keys, respective ones of the keys enabling predetermined switching operations.

25. A television telephone according to claim 24, wherein at least one of the keys of the key console unit controls outward transmission of the visual signal from the television telephone.

26. A television telephone according to claim 23, wherein the communication control means is disposed in a bottom section together with the external input/output terminal connection control means and the key operation selecting control means, the visual input means and the display means being disposed in a movable head section, and image encoder/decoder means for encoding image input signals and for decoding received image signal being disposed in a support section connecting the bottom section and the movable head section.

27. A television telephone according to claim 26, wherein the bottom section, the support section and the movable head section are separate units connectable to one another, the movable head section being arranged for movement with respect to the support section, and the image encoder/decoder means disposed in the support section including a picture codec unit.

28. A television telephone according to claim 23, wherein the plurality of terminal connections of the external input/output terminal connection control means include a serial data input/output terminal connection and a parallel data input/output terminal mounted on the rear surface of the bottom section of the television telephone and disposed between a substrate of the communication control means and a substrate of the internal audio and visual input/output means.

29. A television telephone according to claim 28, wherein the plurality of terminal connections of the external input/output terminal connection control means further include a power input terminal connection, a voice input terminal connection, a voice output terminal connection, an image input terminal connection, an image output terminal connection and an interface terminal connection mounted on the rear surface of the bottom section of the television telephone and disposed between the substrate of the communication control means and the substrate of the internal audio and visual input/output means.

30. A television telephone comprising:
   image input means for inputting at least one of a moving picture image and a still picture image;
   display means for displaying image signals;
   communication control means for transmitting and receiving encoded information of audio and visual signals in a plurality of transmission modes to and from a communication network, the communication control means including means for multiplexing the encoded information and for demultiplexing the received encoded information;
   telephone control means for controlling the transmission/reception functions and including a key console unit;
   image encoding/decoding means including an image encoder circuit for encoding image input signals and an image decoder circuit for decoding received image signals; and
   mode control means for enabling transmitted and received images in a predetermined transmission of images of at least one of moving picture, animation, still pictures, photographs and drawings, the mode control means providing position responsive attitude control for the image input means for enabling transformation of an inputted image in point symmetry rotated by 180° by controlling a direction of read out of the input image signals from a frame memory and transmission of the transformed image and being responsive to key operation of the key console unit.

31. A television telephone according to claim 30, wherein the key console unit includes a plurality of keys, respective ones of the keys enabling predetermined operations.

32. A television telephone according to claim 31, wherein at least one of the keys of the key console unit controls outward transmission of the visual signal from the television telephone.

33. A television telephone according to claim 30, wherein the communication control means is disposed in a bottom section together with the telephone control means and mode control means, the image input means and the display means being disposed in a movable head section, and the image encoding/decoding means being disposed in a support section connecting the bottom section and the movable head section.

34. A television telephone according to claim 33, wherein the bottom section, the support section and the movable head section are separate unit connectable to one another, the movable head section being arranged for movement with respect to the support section, and the image encoder/decoder means disposed in the support section including a picture codec unit.

35. A television telephone according to claim 30, wherein the display means is responsive to the transformed image for displaying the transformed image for monitoring purposes as a picture-in-picture on a display screen thereof.

36. A television telephone comprising:
   image input means for inputting at least one of a moving picture image and still picture image;
   display means for displaying image signals on at least one of a plurality of screens such that different images from respective ones of the screens are enabled to be viewed in at least one different portions of a viewable screen and in superposed relation on the viewable screen;
   communication control means for multiplexing encoded information of audio and visual signals in different communication modes and enabling transmission of the encoded information to a communication network and receipt of encoded information from the communication network, the communication control means enabling demultiplexing of the received encoded information;
   image encoding/decoding means including an image encoder circuit for encoding image input signals and in image decoder circuit for decoding received image signals; and
   image control means for enabling images inputted through the image input means to be displayed for monitoring purposes with respect to outgoing transmission images thereof on one of the screens of the display means together with images received through the image decoder circuit, the image control means enabling control of outgoing images for transmission and interruption thereof in response to key operation of the key console unit, the image control means enabling input images to be transformed in point symmetry rotated by 180° and transmission of the transformed images so that the transformed images are displayed on the viewable screen of the display mean for monitoring purposes as a picture-in-picture display.

37. A television telephone according to claim 36, wherein the key console unit includes a plurality of keys, respective ones of the keys enabling predetermined operations.

38. A television telephone according to claim 36, wherein the communication control means is disposed in a bottom section together with a telephone control means and the image control means, the image input means and the display means being disposed in a movable head section, and the image encoding/decoding means being disposed in a support section connecting the bottom section and the movable head section.

39. A television telephone according to claim 38, wherein the bottom section, the support section and the movable head section are separate unit connectable to one another, the movable head section being arranged for movement with respect to the support section, and the image encoder/decoder means disposed in the support section including a picture codec unit.

40. A television telephone according to claim 36, wherein the image input means includes a frame memory for storing image signals written therein in a predetermined sequence, the image control means enabling reading out of the image signals from the frame memory in a different sequence to the writing in predetermined sequence thereof so as to transform the images in point symmetry rotated by 180°.

* * * * *